(12) United States Patent
Abe

(10) Patent No.: US 6,961,557 B2
(45) Date of Patent: Nov. 1, 2005

(54) ELECTRONIC SERVICE PROVIDING SYSTEM

(75) Inventor: Toru Abe, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 550 days.

(21) Appl. No.: 10/105,264

(22) Filed: Mar. 26, 2002

(65) Prior Publication Data
US 2002/0142751 A1 Oct. 3, 2002

(30) Foreign Application Priority Data

Apr. 3, 2001 (JP) .............................. 2001-105140

(51) Int. Cl.7 ............................................ H04M 11/00
(52) U.S. Cl. .................... 455/406; 455/405; 379/114.2
(58) Field of Search ............................... 455/405–411; 379/114.1 TO, 114.13, 114.2 TO, 114.26, 379/133–134; 705/30, 32, 34

(56) References Cited

U.S. PATENT DOCUMENTS

2002/0133400 A1 * 9/2002 Terry et al. ................... 705/14

FOREIGN PATENT DOCUMENTS

WO WO99/09502 2/1999

* cited by examiner

Primary Examiner—Duc Nguyen
(74) Attorney, Agent, or Firm—Louis Woo

(57) ABSTRACT

An electronic service providing system includes a shop-side terminal device, a user-side terminal device, and an electronic service management server connectable with each other. The electronic service management server has a customer card database storing an electronic customer card representative of shop-related use points related to a history of purchases made by a user at a shop. The user-side terminal device receives the electronic customer card from the electronic service management server. The user-side terminal device indicates the electronic customer card when a purchase is made at the shop. Information of shop-related use points given by the shop in relation to the purchase is sent from the shop-side terminal device to the electronic service management server. The electronic service management server adds the notified shop-related use points to the electronic customer card to update the electronic customer card. The updated electronic customer card is stored in the customer card database.

3 Claims, 21 Drawing Sheets

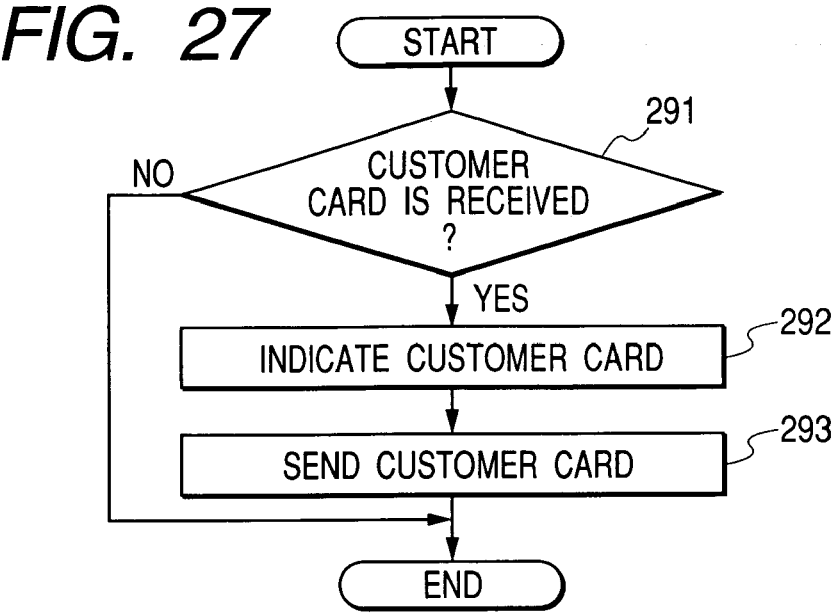
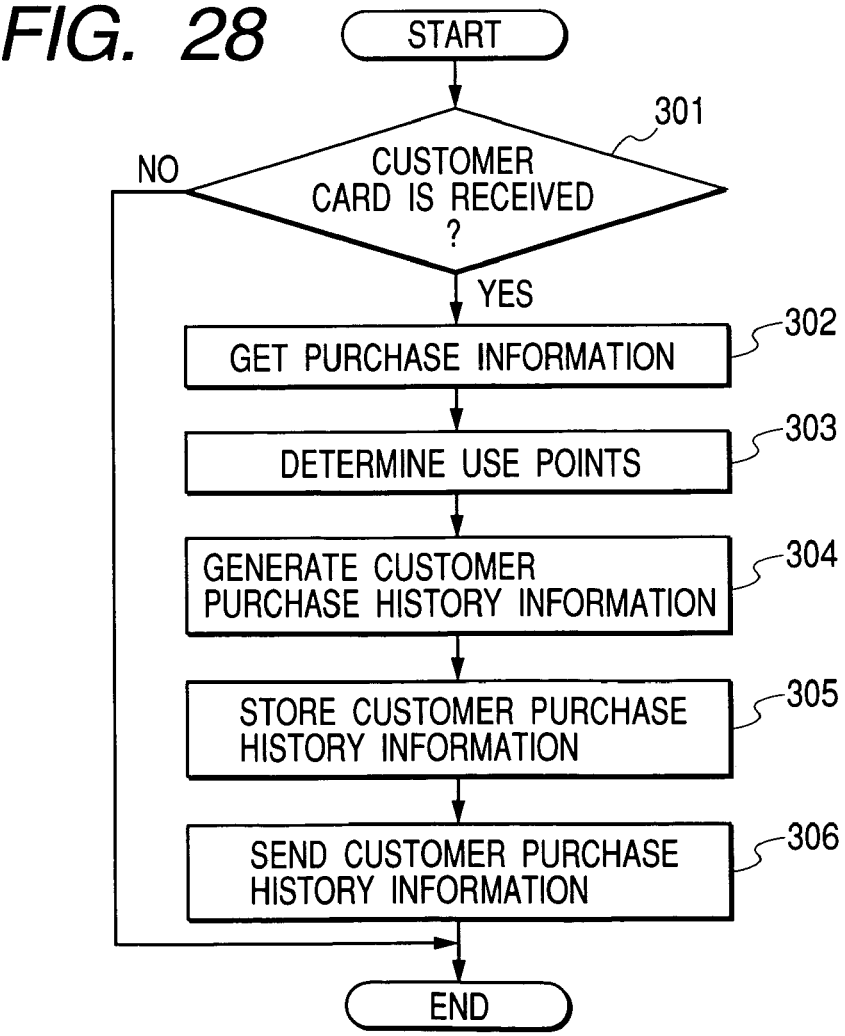

ELECTRONIC SERVICE PROVIDING SYSTEM

BACKGROUND OF THE INVENTION

1. Field of the Invention

This invention generally relates to an electronic service providing system. This invention particularly relates to a system for providing additional services to users when they make purchases at shops by use of mobile telephone sets or communication terminal devices. The shops include actual shops and on-line shops (cyber-shops) on the Internet.

2. Description of the Related Art

European patent application EP 0950968 corresponding to PCT application WO 99/09502 discloses a mobile electronic commerce system in which users have electronic wallets in mobile terminal devices capable of communicating with a service providing means by radio. Electronic tickets, electronic prepaid cards, and electronic telephone cards can be installed from the service providing means into the user's electronic wallets through radio communications between the service providing means and the terminal devices. The service providing means can be connected with suppliers of goods and services via a communication means. By using the cards and tickets, the users receive goods, services, and necessary permissions therefor from the suppliers. The users settle accounts by using their electronic wallets and communicating with terminal devices of the suppliers. The data of the settlement of the accounts are sent from the suppliers to the service providing means. The data of the settlement of the accounts are managed by the service providing means. Each of the cards and tickets has a portion to be shown to a supplier, a program portion for supporting transactions specific to the type of the card or ticket, and a certificate portion indicating that the card or ticket has been registered for use.

In the system of European application EP 0950968, each of shops, shopping malls, and negotiable-card companies gives service points (use points) to customers as its own service. Specifically, a customer receives use points when using a shop or a negotiable card. In the case where customer's use points reach a predetermined value, the customer can receive a prescribed service such as a discount or a premium.

In the system of European application EP 0950968, programs for generating the cards and tickets are absent from actual shops.

Therefore, it is difficult for the actual shops to see and manage the purchase histories of customers through the cards and tickets. As previously mentioned, the service providing means manages the data of the settlement of the accounts. Use-point giving services related to respective negotiable cards are independent of each other. Also, use-point giving services provided by respective shops are independent of each other. Thus, regarding each customer, received use points related to different negotiable cards or different shops can not be employed as the sum thereof. Accordingly, received use points related to each of different negotiable cards or different shops tends to be lower than a premium-qualification value for a long time.

SUMMARY OF THE INVENTION

It is a first object of this invention to provide an electronic service providing system improved to synthetically manage use points (service points) given to customers.

It is a second object of this invention to provide an electronic service providing system improved in user's convenience about use points.

A first aspect of this invention provides an electronic service providing system comprising a shop-side terminal device, a user-side terminal device, and an electronic service management server connectable with each other, the shop-side terminal device being located in a shop, the user-side terminal device being possessed by a user, the electronic service management server having a customer card database storing an electronic customer card representative of shop-related use points related to a history of purchases made by the user at the shop; means for sending the electronic customer card from the electronic service management server to the user-side terminal device; means provided in the user-side terminal device for indicating the electronic customer card when a purchase is made at the shop; means for sending information of shop-related use points given by the shop in relation to the purchase from the shop-side terminal device to the electronic service management server; means provided in the electronic service management server for adding the shop-related use points given by the shop to the electronic customer card to update the electronic customer card; and means provided in the electronic service management server for storing the updated electronic customer card in the customer card database.

A second aspect of this invention is based on the first aspect thereof, and provides an electronic service providing system further comprising a negotiable-card management server to which the electronic service management server is connectable, the negotiable-card management server managing a negotiable card for settling an account concerning a purchase, the negotiable card being possessed by the user; a card point conversion table provided in the electronic service management server and determining a rate of trade between shop-related use points given by the shop and negotiable-card-related use points given in response to use of the negotiable card; and means for allowing diversion between the shop-related use points and the negotiable-card-related use points by reference to the card point conversion table.

A third aspect of this invention is based on the first aspect thereof, and provides an electronic service providing system wherein the electronic service management server has an ownership group conversion table determining rates of trades among shop-related use points given by the shop and other shops, and diversion is allowed among the shop-related use points given by the shop and other shops.

A fourth aspect of this invention is based on the second aspect thereof, and provides an electronic service providing system wherein the shop-related use points or the negotiable-card-related use points can be transferred between the user and another user.

BRIEF DESCRIPTION OF THE DRAWINGS

FIG. 27 is a flowchart of a fourth segment of the computer program for the non-mobile user terminal device or the mobile user terminal device in FIG. 1.

FIG. 28 is a flowchart of a fifth segment of the computer program for the shop-side terminal device in FIG. 1.

DETAILED DESCRIPTION OF THE INVENTION

Figure 1:
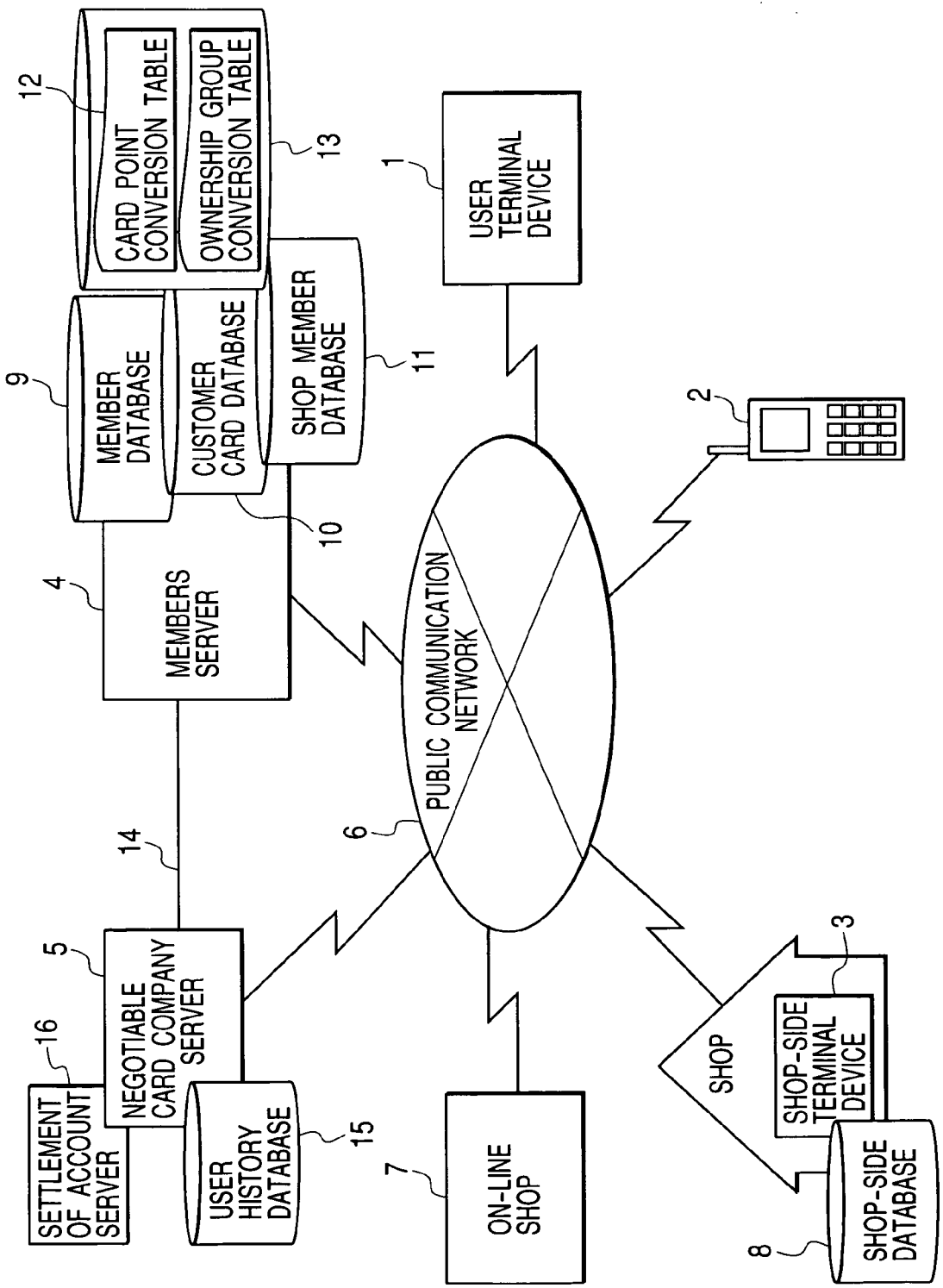
FIG. 1 is a diagram of an electronic service providing system according to an embodiment of this invention.

FIG. 1 shows an electronic service providing system according to an embodiment of this invention. The system of FIG. 1 handles use points which are given to customers (users) as follows. When customers make purchases at shops, they receive corresponding use points from the shops. These use points are referred to as the first use points or the shop-related use points. When customers make purchases with employing negotiable cards (valuable cards), they receive corresponding use points. These use points are referred to as the second use points or the negotiable-card-related use points.

The system of FIG. 1 includes a non-mobile user terminal device 1 and a mobile user terminal device 2 which are user-side terminal devices possessed by a user or users (a customer or customers). The system of FIG. 1 also includes a shop-side terminal device 3, a members server (an electronic service management server) 4, and a negotiable-card company server 5. The non-mobile user terminal device 1, the mobile user terminal device 2, the shop-side terminal device 3, the members server 4, and the negotiable-card company server 5 can connect with a public communication network 6 such as the Internet. An on-line shop (a cyber-shop) 7 for selling goods is connected with the public communication network 6.

An example of the non-mobile user terminal device 1 is a desktop or laptop computer located in a user's home and equipped with a display, a communication interface for connecting a main portion of the computer to the public communication network 6, input and output sections for inputting and outputting information into and from the main portion of the computer in accordance with user's requests, a memory storing a control program (a computer program), and other memories.

An example of the mobile user terminal device 2 is a mobile telephone set or a personal digital assistant (PDA) containing a computer. The computer in the mobile user terminal device 2 is equipped with a display, a communication interface for connecting a main portion of the computer to the public communication network 6, input and output sections for inputting and outputting information into and from the main portion of the computer in accordance with user's requests, a memory storing a control program (a computer program), and other memories. The computer in the mobile user terminal device 2 may be equipped with an infrared communication interface or a Bluetooth communication interface for connection to the shop-side terminal device 3.

The shop-side terminal device 3 is formed by a computer located in an actual shop such as a convenience shop and equipped with a display, a communication interface for connecting a main portion of the computer to the public communication network 6, input and output sections via which information can be inputted into and outputted from the main portion of the computer, a memory storing a control program (a computer program), and other memories. The shop-side terminal device 3 includes a shop-side database 8 storing information about the histories of purchases made by customers (users) at registered shops. The shop-side database 8 also stores information about the registration of shop members with the members server 4. The computer of the shop-side terminal device 3 may be provided with an infrared communication interface or a Bluetooth communication interface for connection to the mobile user terminal device 2.

The members server 4 is designed to manage membership. The members server 4 is formed by a computer equipped with a communication interface for connecting a main portion of the computer to the public communication network 6, a memory storing a control program (a computer program), and other memories. The members server 4 can be connected with the negotiable-card company server 5 via an exclusive line or a leased line 14. The computer of the members server 4 is equipped with a communication interface for connecting the main portion of the computer to the exclusive line 14. The members server 4 includes a member database 9 storing information about the privacies of registered users and also information about negotiable cards possessed by the registered users, a customer card database 10 storing electronic customer cards of the registered users, a shop member database 11 storing various types of information about registered shops, a card point conversion table 12 storing information about rates of trades between shop-related use points and negotiable-card-related use points (use points given by the registered shops and use points on negotiable cards), and an ownership group conversion table 13 storing various types of information about shops registered with ownership groups and also information about rates of trades among shop-related use points given by the shops registered with the ownership groups. The electronic customer cards in the customer card database 10 contain information about the histories of purchases made by the registered users at the registered shops. Specifically, the electronic customer cards contain information about shop-related use points and negotiable-card-related use points collected by the registered users. The members server 4 has information about use points which are given to customers when they employ negotiable cards. The members server 4 also has information about an ownership group or ownership groups. The members server 4 further has information about registered users.

The negotiable-card company server 5 is formed by a computer equipped with a communication interface for connecting a main portion of the computer to the public communication network 6, a memory storing a control program (a computer program), and other memories. The negotiable-card company server 5 can be connected with the members server 4 via the exclusive line (the leased line) 14. The computer of the negotiable-card company server 5 is equipped with a communication interface for connecting the main portion of the computer to the exclusive line 14. The negotiable-card company server 5 is designed to manage negotiable cards possessed by registered users. The negotiable-card company server 5 has information which can be used in deciding whether or not negotiable cards in question are permitted to be employed in shop sides. The negotiable-card company server 5 includes a user history database 15 storing information about the privacies of negotiable-card users and also information about the purchase histories of the negotiable-card users. The purchase history information contains an information piece representing negotiable-card-related use points collected by the negotiable-card users. The negotiable-card company server 5 further includes a settlement-of-accounts server 16 for settling accounts about purchases and sales by use of negotiable cards.

The settlement-of-accounts server 16 may be located separately from or independently of the negotiable-card company server 5. The settlement-of-accounts server 16 may be located in the members server 4. In this case, it is possible to synthetically manage the settlement of accounts about shops and users registered with the members server 4.

The on-line shop 7 is a site provided on the public communication network 6. The on-line shop 7 includes a server formed by a computer equipped with a communication interface for connecting a main portion of the computer to the public communication network 6, a memory storing a control program (a computer program), and other memories. The on-line shop 7 is designed for selling goods in response to information sent from users which represents users' orders and identification (ID) numbers of negotiable cards possessed by the users.

Shop member registration means that shops register them with the membership managed by the members server 4. The shops include the actual shop and the on-line shop 7. As previously mentioned, the actual shop has the shop-side terminal device 3. The server of the on-line shop 7 or the shop-side terminal device 3 in the actual shop implements the shop member registration.

Figure 2:
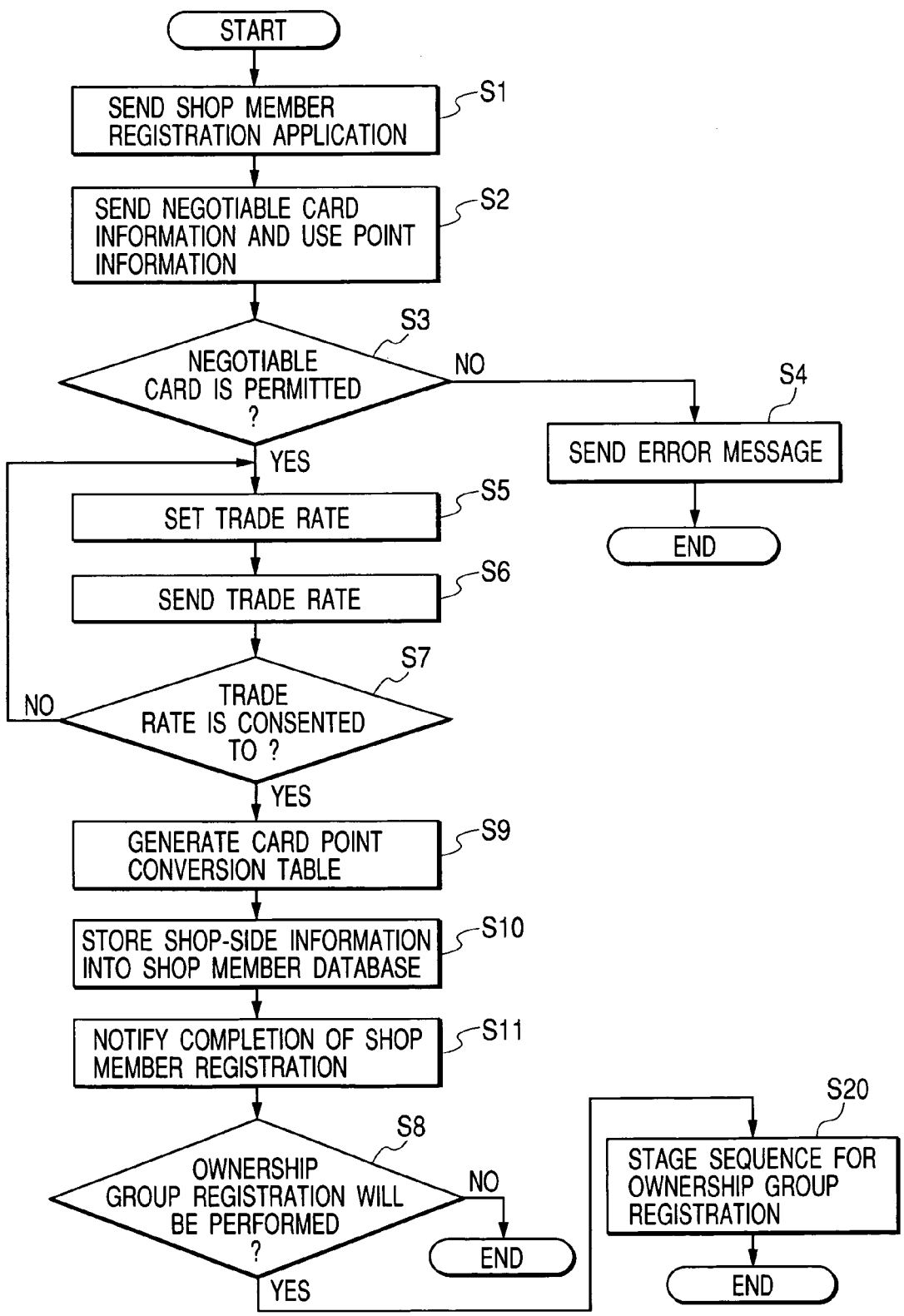
FIG. 2 is a flow diagram of operation of the system in FIG. 1 which relates to shop member registration.

FIG. 2 shows a flow of operation of the system in FIG. 1 which relates to the shop member registration. With reference to FIG. 2, at a first stage S1, a shop side (the server of the on-line shop 7 or the shop-side terminal device 3 in the actual shop) sends information of a shop member registration application to the members server 4 via the public communication network 6. The shop member registration application is a request for shop member registration.

At a stage S2 following the stage S1, the shop side sends, to the members server 4, information of a type or types of negotiable cards acceptable and handleable by the shop side and also information about use points given by the shop side. Thus, the members server 4 is notified of the type or types of negotiable cards acceptable and handleable by the shop side and also the use points given by the shop side. As previously mentioned, the use points are given to the users when they make purchases at the shop side.

At a stage S3 subsequent to the stage S2, the members server 4 communicates with the negotiable-card company server 5 via the exclusive line 14 or the public communication network 6. Specifically, the members server 4 inquires of the negotiable-card company server 5 as to whether or not the notified type or types of negotiable cards are permitted to be employed in the shop side in question. The members server 4 receives a reply to the inquiry from the negotiable-card company server 5. By referring to the reply, the members server 4 decides whether or not the notified type or types of negotiable cards are permitted to be employed in the shop side in question. When it is decided that the notified type or types of negotiable cards are permitted to be employed in the shop side in question, the stage S3 is followed by a stage S5. Otherwise, the stage S3 is followed by a stage S4. At the stage S4, the members server 4 sends a signal representative of an error message to the shop side via the public communication network 6. At the stage S5, the members server 4 compares the use points (the shop-related use points) given to users when they make purchases at the shop side in question and the use points (the negotiable-card-related use points) given to users when they employ negotiable cards. The use points given to users when they make purchases at the shop side in question are referred to as the first use points or the shop-related use points. On the other hand, the use points given to users when they employ negotiable cards are referred to as the second use points or the negotiable-card-related use points. At the stage S5, the members server 4 sets a rate of trade between the first use points (the shop-related use points) and the second use points (the negotiable-card-related use points) in response to the comparison result.

It is assumed that a user receives use points of "1" when buying an article at a price of 1,000 yen via a negotiable card, and receives use points of "1" when buying an article at a price of 500 yen at the shop side in question. In this case, the members server 4 sets the trade rate to "0.5". The trade rate means the trade ratio of the shop-related use points to the negotiable-card-related use points (the shop-related use points/the negotiable-card-related use points, that is, the first use points/the second use points). Thus, the member server 4 equalizes the value scale of the shop-side-related use points and the value scale of the negotiable-card-related use points. The members server 4 may set the trade rate to a value selected from predetermined values. The members server 4 may unequalize the value scale of the shop-side-related use points and the value scale of the negotiable-card-related use points.

At a stage S6 following the stage S5, the members server 4 sends information about the trade rate set at the stage S5 to the shop side via the public communication network 6. Thus, the shop side is notified of the set trade rate. At a stage S7 subsequent to the stage S6, the shop side decides whether or not the notified trade rate should be consented to. When it is decided that the notified trade rate should be consented to, the shop side sends a signal representative of the consent to the members server 4 via the public communication network 6. In this case, the stage S7 is followed by a stage S9. When it is decided that the notified trade rate should not be consented to, the shop side resends the use-point-related information to the members server 4 and the stage S7 is followed by the stage S5 so that the members server 4 will repeat the trade-rate setting procedure. In this case, at the stage S5, the members server 4 will set a trade rate different from the first one.

At the stage S9, the members server 4 generates a card point conversion table 12 storing information about the set trade rate. At a stage S10 subsequent to the stage 89, the members server 4 loads the shop member database 11 with information about the shop side in relation to the generated card point conversion table 12. At a stage S11 following the stage S10, the members server 4 notifies the shop side of the completion of the shop member registration via the public communication network 6.

At a stage S8 subsequent to the stage S11, the members server 4 communicates with the shop side via the public communication network 6. Specifically, the members server 4 sends guidance information about an ownership group to the shop side. The members server 4 inquires of the shop side as to whether or not the shop side will perform ownership group registration. The members server 4 receives a reply to the inquiry from the shop side. By referring to the reply, the members server 4 decides whether or not the shop side will perform the ownership group registration. When it is decided that the shop side will perform the ownership group registration, the stage S8 is followed by a stage sequence S20. Otherwise, the operation of the system in FIG. 1 which relates to the shop member registration ends.

An ownership group means a set of shops registered as members (that is, shops which have done the shop member registration) among which use points can be exchanged or interchanged. Thus, use points given by a shop in the ownership group can be used in another shop therein.

Figure 3:
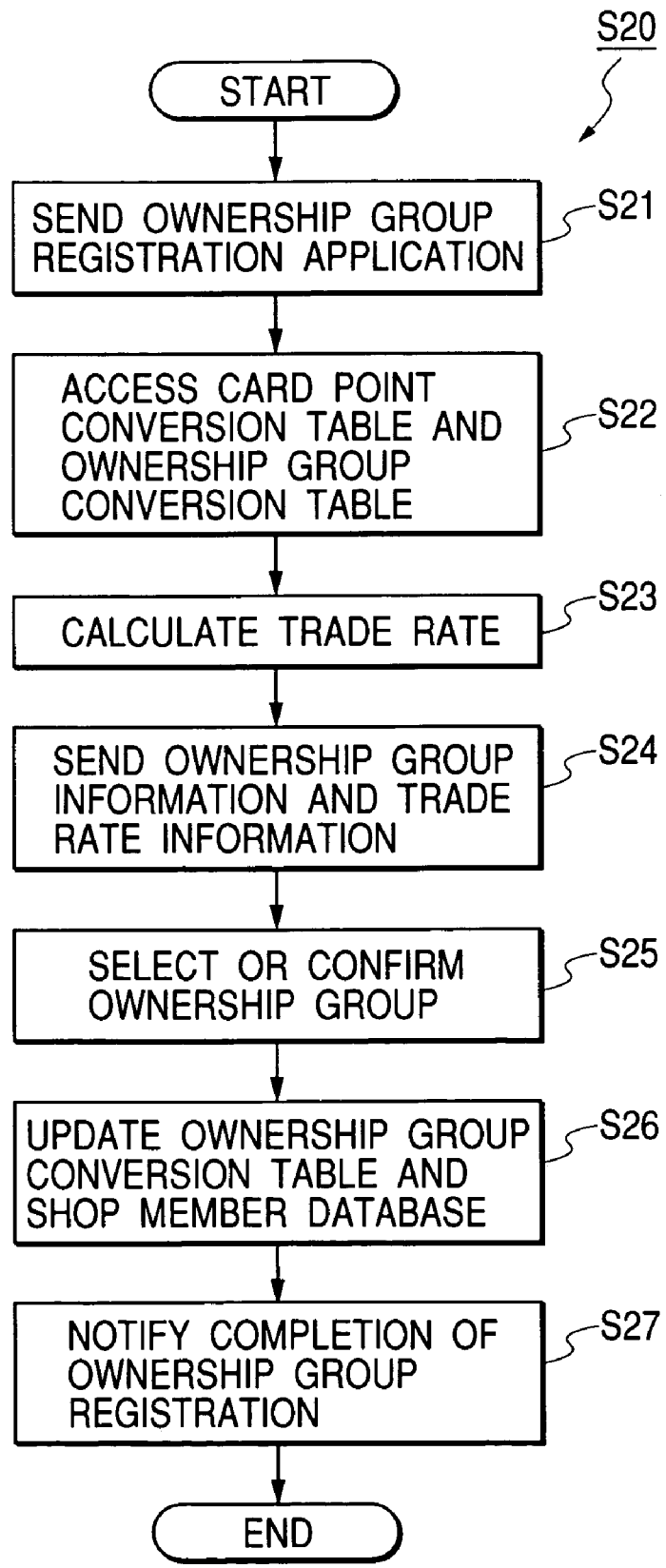
FIG. 3 is a flow diagram of the contents of a stage sequence in FIG. 2.

FIG. 3 shows the contents of the stage sequence S20 in FIG. 2. In the stage sequence S20, a shop side substantially registered as a member (that is, a shop side which has substantially done the shop member registration) performs ownership group registration. The ownership group registration may be performed during the execution of the shop member registration. For example, at the stage S8 in FIG. 2, the ownership group registration is applied for. Alternatively, the ownership group registration may be performed after the completion of the shop member registration.

With reference to FIG. 3, at a first stage S21 in the stage sequence S20, the shop side sends information of an ownership group registration application to the members server 4 via the public communication network 6. The ownership group registration application is a request for ownership group registration. Thus, the members server 4 receives the ownership group registration application. At a stage S22 following the stage S21, the members server 4 accesses the card point conversion table 12 and the ownership group conversion table 13. At a stage S23 subsequent to the stage S22, the members server 4 calculates rates of trades among use points in shop sides within the ownership group by referring to the accessed tables 12 and 13. At a stage S24 following the stage S23, the members server 4 communicates with the shop side via the pubic communication network 6. Specifically, the members server 4 sends, to the shop side, ownership-group-related information containing information representative of a list of other shops registered with the ownership group and also information about the use-points trade rates in the ownership group. In the presence of plural ownership groups, the members server 4 sends ownership-group-related information regarding each of the ownership groups. In this case, the shop side can select one among the ownership groups and determine which of the ownership groups with which registration should be done.

At a stage S25 subsequent to the stage S24, the shop side selects one among the ownership groups and hence determines which of the ownership groups with which registration should be done. At the stage S25, the shop side notifies the members server 4 of the selected ownership group with which registration should be done. Alternatively, the shop side confirms the ownership group registration, and notifies the members server 4 of the confirmation. At a stage S26 following the stage S25, the members server 4 registers the shop side with the ownership group (the selected ownership group) defined in the ownership group conversion table 13. At the stage S26, the members server 4 also registers the trade rates concerning the newly-registered shop side with the ownership group conversion table 13. Thus, the members server 4 registers the shop side and the related trade rates with the ownership group conversion table 13. Therefore, the members server 4 updates the ownership group conversion table 13. At the stage S26, the members server 4 writes the ownership group registration in the shop-side information within the shop member database 11. Thus, the members server 4 updates the shop member database 11. At a stage S27 subsequent to the stage S26, the members server 4 notifies the shop side of the completion of the ownership group registration via the public communication network 6.

User registration means that users register them with the membership managed by the members server 4. A user performs the user registration while using the non-mobile user terminal device 1, the mobile user terminal device 2, or the shop-side terminal device 3.

Figure 4:
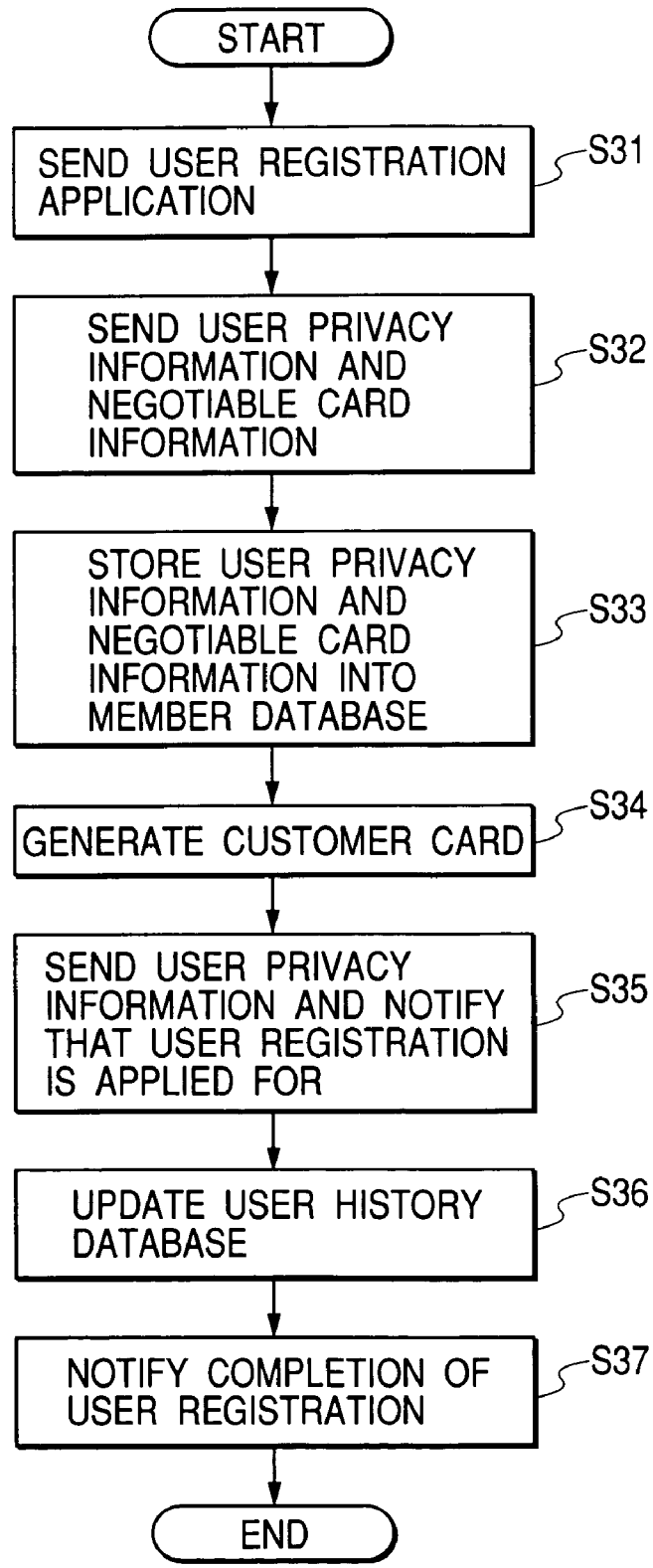
FIG. 4 is a flow diagram of operation of the system in FIG. 1 which relates to user registration.

FIG. 4 shows a flow of operation of the system in FIG. 1 which relates to the user registration. With reference to FIG. 4, at a first stage S31, a user side (the non-mobile user terminal device 1, the mobile user terminal device 2, or the shop-side terminal device 3) sends information of a user registration application to the members server 4 via the public communication network 6. The user registration application is a request for user registration. Thus, the members server 4 receives the user registration application. At a stage S32 following the stage S31, the user side communicates with the members server 4 via the public communication network 6. Specifically, the user side sends, to the members server 4, information about the privacy of the user and also information about the type and ID number of a negotiable card possessed by the user. Thus, the members server 4 receives the user privacy information and the user negotiable-card information. For example, the privacy of the user contains the name and address of the user, and the address of the user side (that is, the address of the non-mobile user terminal device 1 or the mobile user terminal device 2).

At a stage S33 subsequent to the stage S32, the members server 4 stores the user privacy information and the user negotiable-card information in the member database 9. Thus, the members server 4 updates the member database 9. At a stage S34 following the stage S33, the members server 4 assigns an ID number (a user ID) to the newly-registered user. At the stage S34, the members server 4 derives use points from, for example, the user negotiable-card information, and totals up the derived use points. At the stage S34, the members server 4 generates an electronic customer card (customer information) of the newly-registered user from the user privacy information, the total of the use points, and the ID number of the newly-registered user. At the stage S34, the members server 4 stores the generated electronic customer card into the customer card database 10. At a stage S35 subsequent to the stage S34, the members server 4 communicates with the negotiable-card company server 5 via the exclusive line 14 or the public communication line 6. Specifically, the members server 4 sends the user privacy information to the negotiable-card company server 5. In addition, the members server 4 notifies the negotiable-card company server 5 that the user registration is applied for. Thus, the negotiable-card company server 5 receives the user privacy information, and is notified that the user registration is applied for. At a stage S36 following the stage S35, the negotiable-card company server 5 adds, to the user privacy information in the user history database 15, the received user privacy information and also the information representing that the new user performs the user registration. Accordingly, the negotiable-card company server 5 updates the user privacy information in the user history database 15. At a stage S37 subsequent to the stage S36, the members server 4 notifies the user side of the completion of the user registration via the public communication network 6.

At the stage S32, the user side may not send the user negotiable-card information to the members server 4. In this case, the registration of the negotiable card is not performed. Specifically, at the stage S32, the user side selects either execution or unexecution of the registration of the negotiable card. In other words, the user side decides whether or not the registration of the negotiable card should be performed. When the unexecution of the registration of the negotiable card is selected, that is, when it is decided that the registration of the negotiable card should not be performed, the user side sends only the user privacy information to the members server 4. In this case, the members server 4 receives only the user privacy information, and the user registration responsive to the user privacy information is performed.

As a result of shop member registrations, information about registered shops is stored in the shop member database 11 in the members server 4. As a result of user registrations, information about registered users is stored in the member database 9 in the members server 4. Electronic customer cards of the registered users are generated. Information about the histories of purchases made by users at shops, information about shop-related use points, and information about negotiable-card-related use points are recorded on the electronic customer cards, and are stored in the customer card database 10.

Information about rates of trades between shop-related use points and negotiable-card-related use points is stored in the card point conversion table 12 in the members server 4. Information about rates of trades among shop-related use points given by shops registered with each ownership group is stored in the ownership group conversion table 13 in the members server 4. In this way, various types of information about registered shop sides and registered users are stored in the members server 4. The registered shop sides and the registered users are able to receive and utilize services provided by the members server 4.

Figure 5:
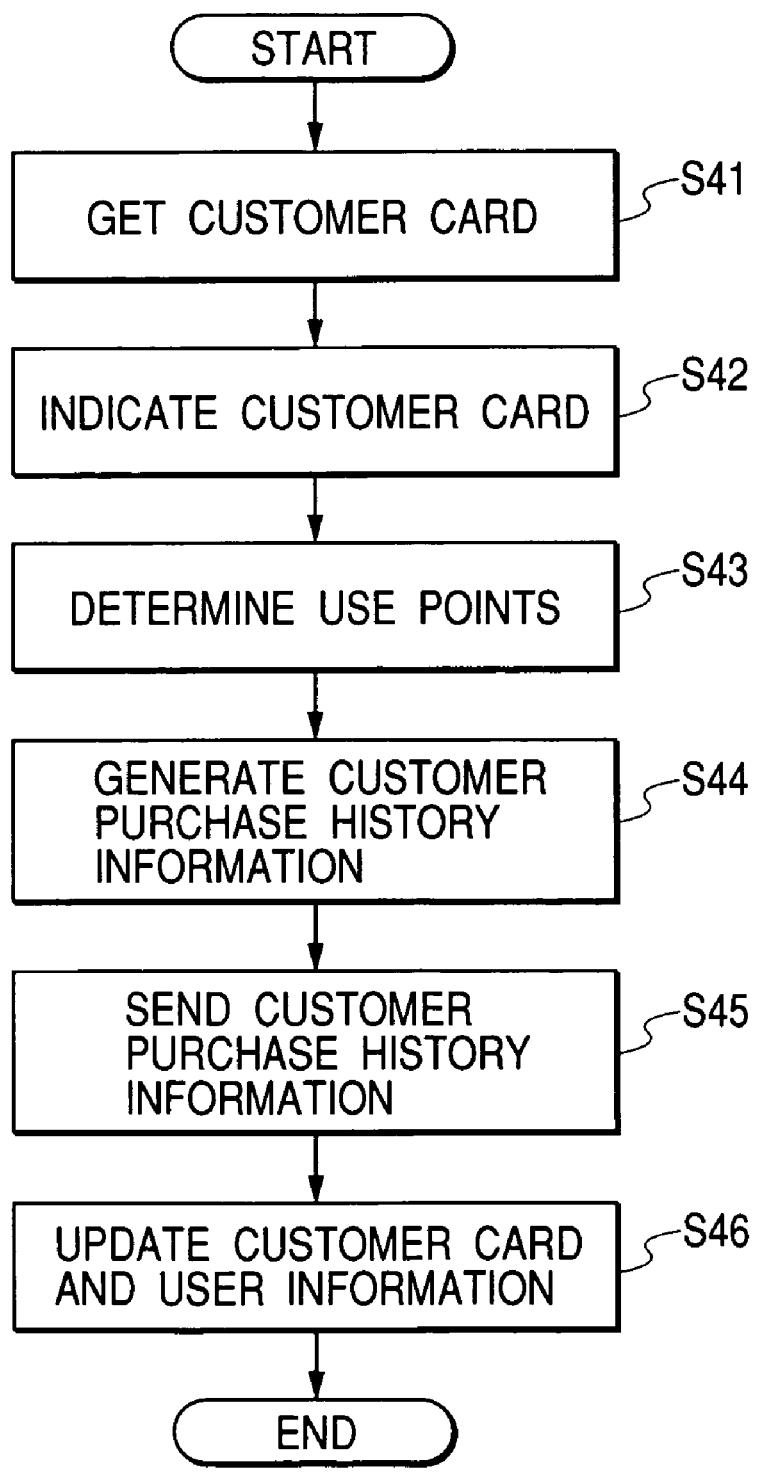
FIG. 5 is a flow diagram of operation of the system in FIG. 1 which occurs in the case where a registered user makes a purchase at a shop without using a negotiable card (a valuable card) and receives the services provided by a members server.

FIG. 5 shows a flow of operation of the system in FIG. 1 which occurs in the case where a registered user makes a purchase at a shop (a shop "AAA") without using a negotiable card and receives the services provided by the members server 4. With reference to FIG. 5, at a first stage S41, a user side (the non-mobile user terminal device 1 or the mobile user terminal device 2) accesses the members server 4 via the public communication network 6. At the stage S41, the user side gets its own customer information (its own electronic customer card) from the members server 4. At the stage S41, the user side indicates the electronic customer card on its display. An electronic customer card may be sent from the members server 4 to the user side on the basis of user's record notified by a shop side.

Figure 6:
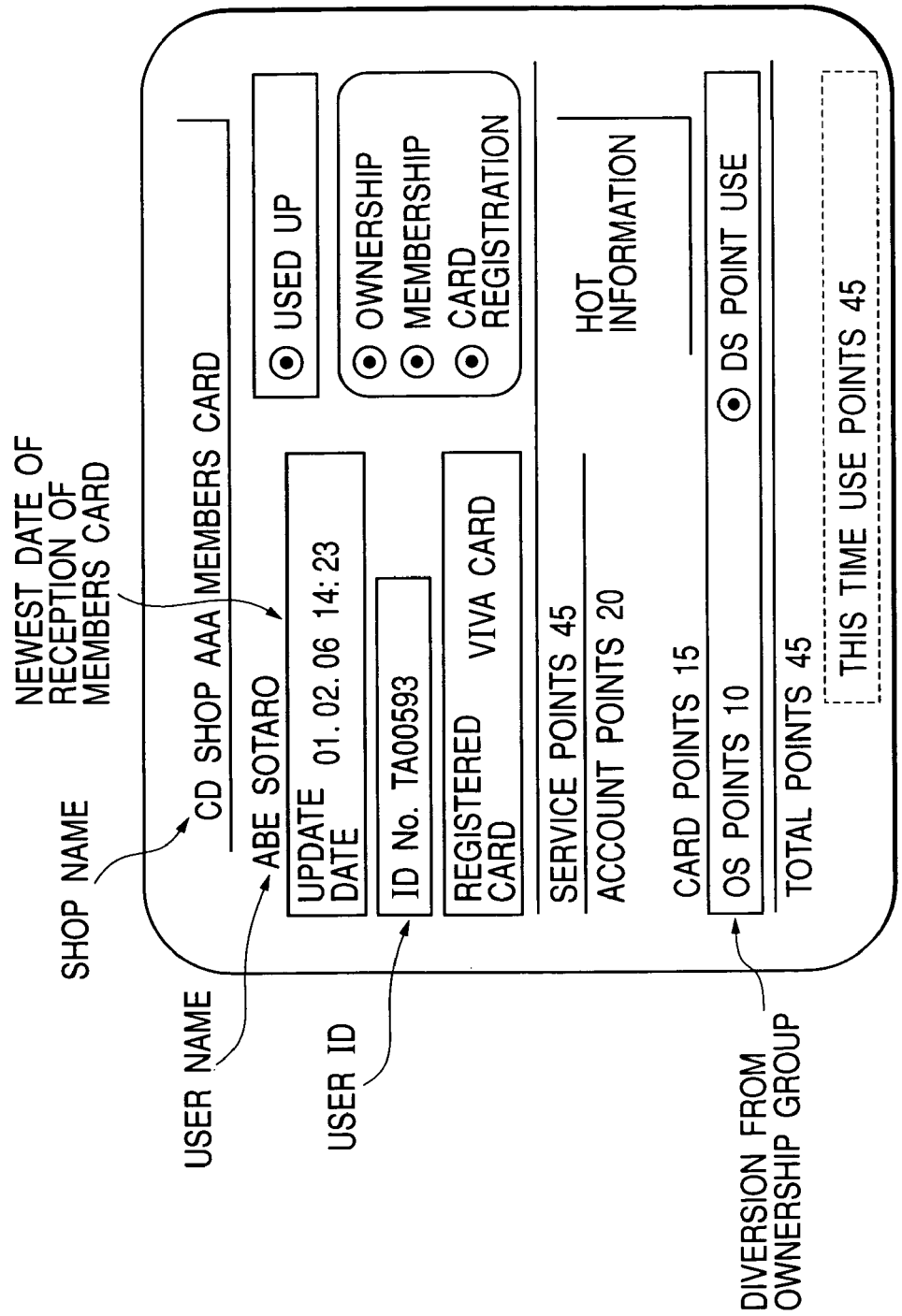
FIG. 6 is a plan diagram showing an example of a picture of an electronic customer card which is indicated on the display of a mobile user terminal device in FIG. 1.

FIG. 6 shows an example of a picture of the electronic customer card which is indicated on the display of the mobile user terminal device (the user side) 2. The electronic customer card contains information about the privacy of the related user. As shown in FIG. 6, the customer card picture denotes the name of the user, the ID number of the user, the type of a negotiable card possessed by the user, the total of use points given to the user by the present shop "AAA" up to now (the account points), the total of negotiable-card-related use points given to the user up to now (the card points), and use points (OS points) caused by a diversion of use points given by other shops in the same ownership group as that containing the present shop "AAA". Preferably, the customer card picture further denotes the name of the present shop "AAA", and service points related to services provided by the present shop "AAA".

With reference back to FIG. 5, at a stage S42 following the stage S41, the user side sends the electronic customer card to the shop-side terminal device 3 via infrared communications or Bluetooth communications. Alternatively, the user shows the indicated customer card to a person in the shop "AAA". In this case, the person in the shop "AAA" inputs at least a portion of the electronic customer card into the shop-side terminal device 3. When the user makes a purchase at the on-line shop 7, the user side sends information about user's order and also the electronic customer card to the server of the on-line shop 7 via the public communication network 6. The shop-side terminal device 3 may access the members server 4 via the public communication network 6 and get the electronic customer card therefrom when the user notifies the shop side of the user's ID number. At the stage S42, the shop-side terminal device 3 gets purchase information which represents the user's order, the name of an ordered article, and the price thereof.

At a stage S43 subsequent to the stage S42, the shop-side terminal device 3 refers to the purchase information and thereby determines shop-related use points given to the user. At a stage S44 following the stage S43, the shop-side terminal device 3 generates customer purchase history information in relation to the user's ID number, the purchase information, and the determined use points. The shop-side terminal device 3 may store the customer purchase history information in an internal memory. In this case, the shop-side terminal device 3 can refer to the history of purchases made by the user at the present shop "AAA" up to now and the record of articles sold to the user at the present shop "AAA" up to now by accessing the stored customer purchase history information. The user may set how many use points among the collected use points will be employed at this time. In this case, information of the use-point setting is inputted into the shop-side terminal device 3.

At a stage S45 subsequent to the stage S44, the shop-side terminal device 3 sends the customer purchase history information to the members server 4 via the public communication network 6. Thus, the members server 4 receives the customer purchase history information. At a stage S46 following the stage S45, the members server 4 updates the electronic customer card of the user in the customer card database 10 and also the information about the user in response to the received customer purchase history information. Accordingly, the user can confirm an increase or a decrease in the use points, which relates to the present purchase, by getting the updated electronic customer card.

Figure 7:
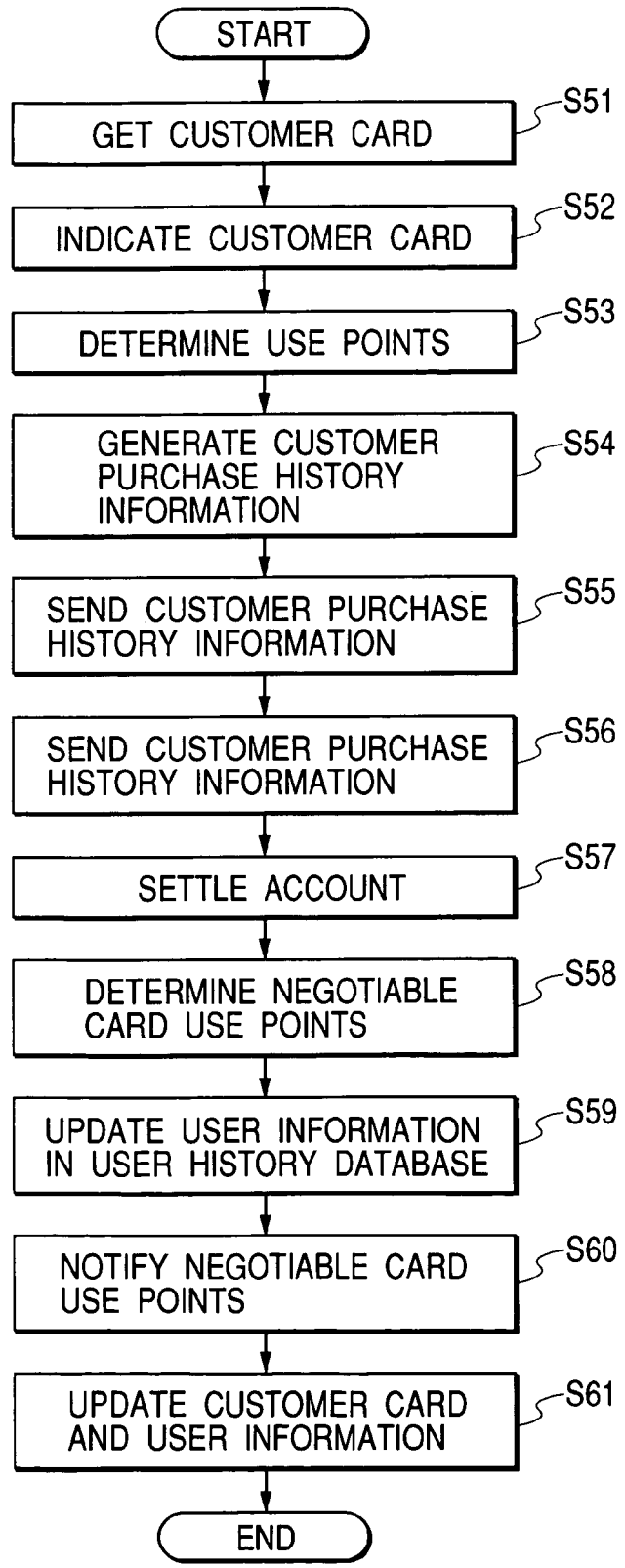
FIG. 7 is a flow diagram of operation of the system in FIG. 1 which occurs in the case where a registered user makes a purchase at a shop with using a negotiable card and receives the services provided by a members server.

FIG. 7 shows a flow of operation of the system in FIG. 1 which occurs in the case where a registered user makes a purchase at a shop (a shop "AAA") with using a negotiable card and receives the services provided by the members server 4. With reference to FIG. 7, at a first stage S51, a user side (the non-mobile user terminal device 1 or the mobile user terminal device 2) accesses the members server 4 via the public communication network 6. At the stage S51, the user side gets its own customer information (its own electronic customer card) from the members server 4. At the stage S51, the user side indicates the electronic customer card on its display. An electronic customer card may be sent from the members server 4 to the user side on the basis of user's record notified by a shop side.

At a stage S52 following the stage S51, the user side sends the electronic customer card to the shop-side terminal device 3 via infrared communications or Bluetooth communications. Alternatively, the user shows the indicated customer card to a person in the shop "AAA". In this case, the person in the shop "AAA" inputs at least a portion of the electronic customer card into the shop-side terminal device 3. When the user makes a purchase at the on-line shop 7, the user side sends information about user's order and also the electronic customer card to the server of the on-line shop 7 via the public communication network 6. The shop-side terminal device 3 may access the members server 4 via the public communication network 6 and get the electronic customer card therefrom when the user notifies the shop side of the user's ID number. At the stage S52, the shop-side terminal device 3 gets purchase information which represents the user's order, the name of an ordered article, and the price thereof.

At a stage S53 subsequent to the stage S52, the shop-side terminal device 3 refers to the purchase information and thereby determines shop-related use points given to the user. At a stage S54 following the stage S53, the shop-side terminal device 3 generates customer purchase history information in relation to the user's ID number, the purchase information, and the use points. The shop-side terminal device 3 adds specified information pieces to the customer purchase history information. First one of the specified information pieces represents that a purchased article is paid for by employing a negotiable card. Second one of the specified information pieces represents the type of the employed negotiable card. Third one of the specified information pieces represents the ID number of the employed negotiable card. The shop-side terminal device 3 may store the customer purchase history information. In this case, the shop-side terminal device 3 can refer to the history of purchases made by the user at the present shop "AAA" up to now and the record of articles sold to the user at the present shop "AAA" up to now by accessing the stored customer purchase history information. The user may set how many use points among the collected use points will be employed at this time. In this case, information of the use-point setting is inputted into the shop-side terminal device 3.

At a stage S55 subsequent to the stage S54, the shop-side terminal device 3 sends the customer purchase history information to the members server 4 via the public communication network 6. Thus, the members server 4 receives the customer purchase history information. At a stage S56 following the stage S55, the members server 4 refers to the negotiable-card-type information piece in the received customer purchase history information, and sends at least related portions of the customer purchase history information to the negotiable-card company server 5 via the exclusive line 14 or the public communication network 6. Thus, the negotiable-card company server 5 receives the customer purchase history information.

At a stage S57 subsequent to the stage S56, the negotiable-card company server 5 settles the account of the purchased article while referring to the received customer purchase history information. At a stage S58 following the stage S57, the negotiable-card company server 5 refers to the customer purchase history information and thereby determines negotiable-card-related use points given to the present user. At a stage S59 subsequent to the stage S58, the negotiable-card company server 5 updates the information in the user history database 15 which relates to the present user. The updating of the information is responsive to the determined negotiable-card-related use points. Specifically, the information in the user history database 15 which represents the negotiable-card-related use points given to the present user is updated.

At a stage S60 following the stage S59, the negotiable-card company server 5 sends a signal representative of the updated negotiable-card-related use points to the members server 4 via the exclusive line 14 or the public communication network 6. Thus, the members server 4 is notified of the updated negotiable-card-related use points. At a stage S61 subsequent to the stage S60, the members server 4 updates the electronic customer card of the present user in the customer card database 10 and also the information about the present user in response to the notified negotiable-card-related use points and also the customer purchase history information. Accordingly, the user can confirm an increase or a decrease in the negotiable-card-related use points or the shop-related use points, which relates to the present purchase, by getting the updated electronic customer card.

Negotiable-card-related use points and shop-related use points may be diverted to each other. It is assumed that negotiable-card-related use points given to a user are "8" and shop-related use points given to the user by a shop "A" are "2", and the trade ratio of the shop-related use points/the negotiable-card-related use points is "0.5". In this case, the members server 4 accesses the card point conversion table 12 and thereby gets information about the trade ratio of the shop-related use points/the negotiable-card-related use points, and newly sets the negotiable-card-related use points to "9" (=8+2·0.5) or newly sets the shop-related use points to "18" (=8·2+2).

Figure 8:
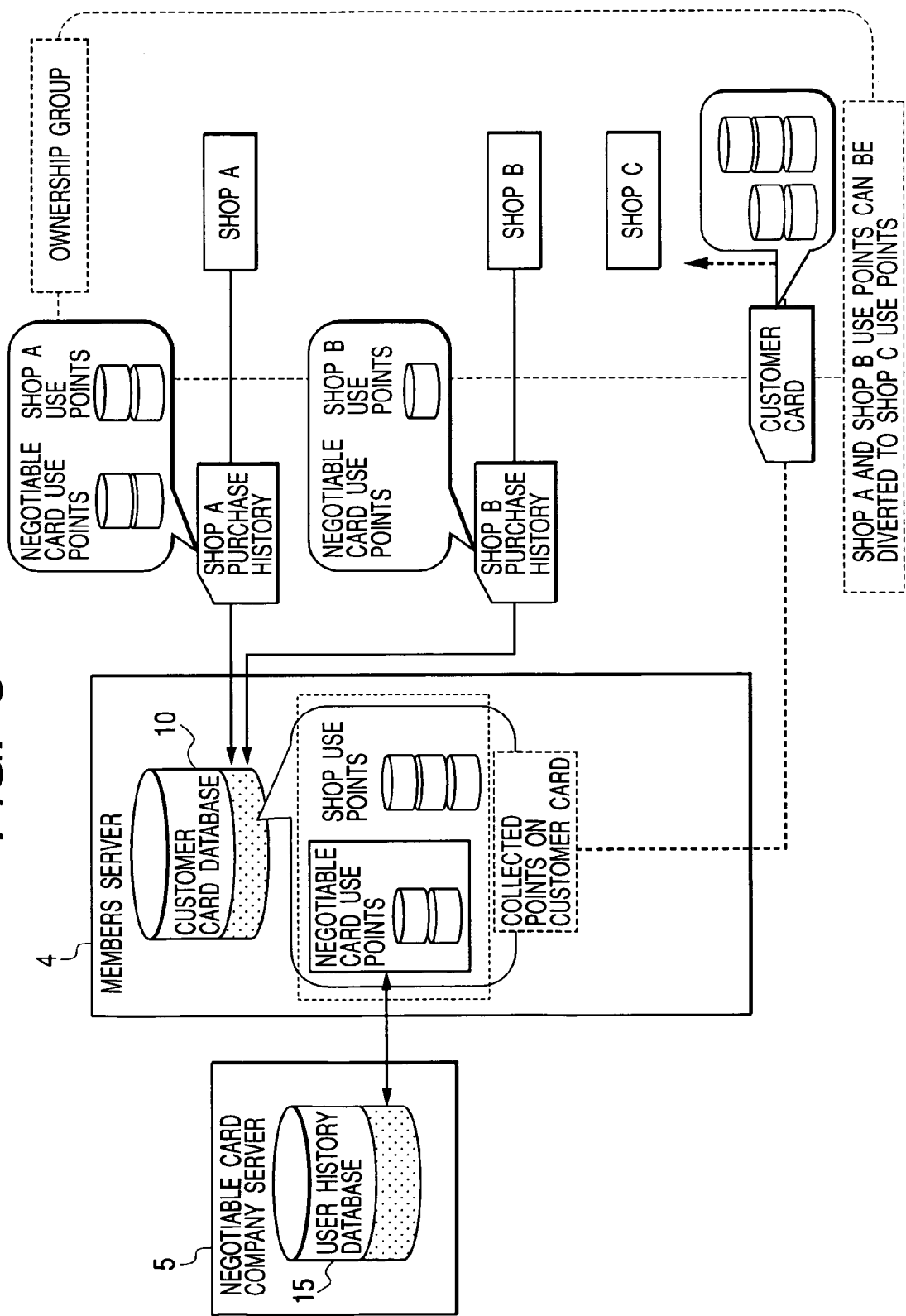
FIG. 8 is a diagram of conditions in which use points are transferred among shops registered with an ownership group.

Similarly, use points may be exchanged or interchanged among shops registered with an ownership group. With reference to FIG. 8, shops "A", "B", and "C" are registered with a same ownership group. It is assumed that all the rates of trades among shop-related use points given by the shops "A", "B", and "C" and negotiable-card-related use points are equal to "1". Also, it is assumed that the shop "C" provides prescribed services in which a gift is presented to every user in exchange for use points of "5". Furthermore, there is an assumed user who has made a first purchase at the shop "A" via a negotiable card and has received negotiable-card-related use points of "2" and shop-related use points of "2" for the first purchase, and who has made a second purchase at the shop "B" without using the negotiable card and has received shop-related use points of "1" for the second purchase.

Since the shops "A", "B", and "C" are registered with the same ownership group, use points can be exchanged or interchanged among them. For example, the assumed user can divert the "2" negotiable-card-related use points, the "2" shop-related use points given by the shop "A", and the "1" shop-related use points given by the shop "B" to use points for the shop "C". In the case where use points are diverted to other ones in such a way, a signal representative of the use-point diversion is inputted into the shop-side terminal device 3 before being sent to the members server 4 and the negotiable-card company server 5. Negotiable-card-related use points and shop-related use points represented by information in the customer card database 10 in the members server 4 and information in the user history database 15 in the negotiable-card company server 5 are updated in accordance with the use-point diversion signal. Specifically, when the negotiable-card-related use points and the shop-related use points are employed, they are reduced.

Figure 9:
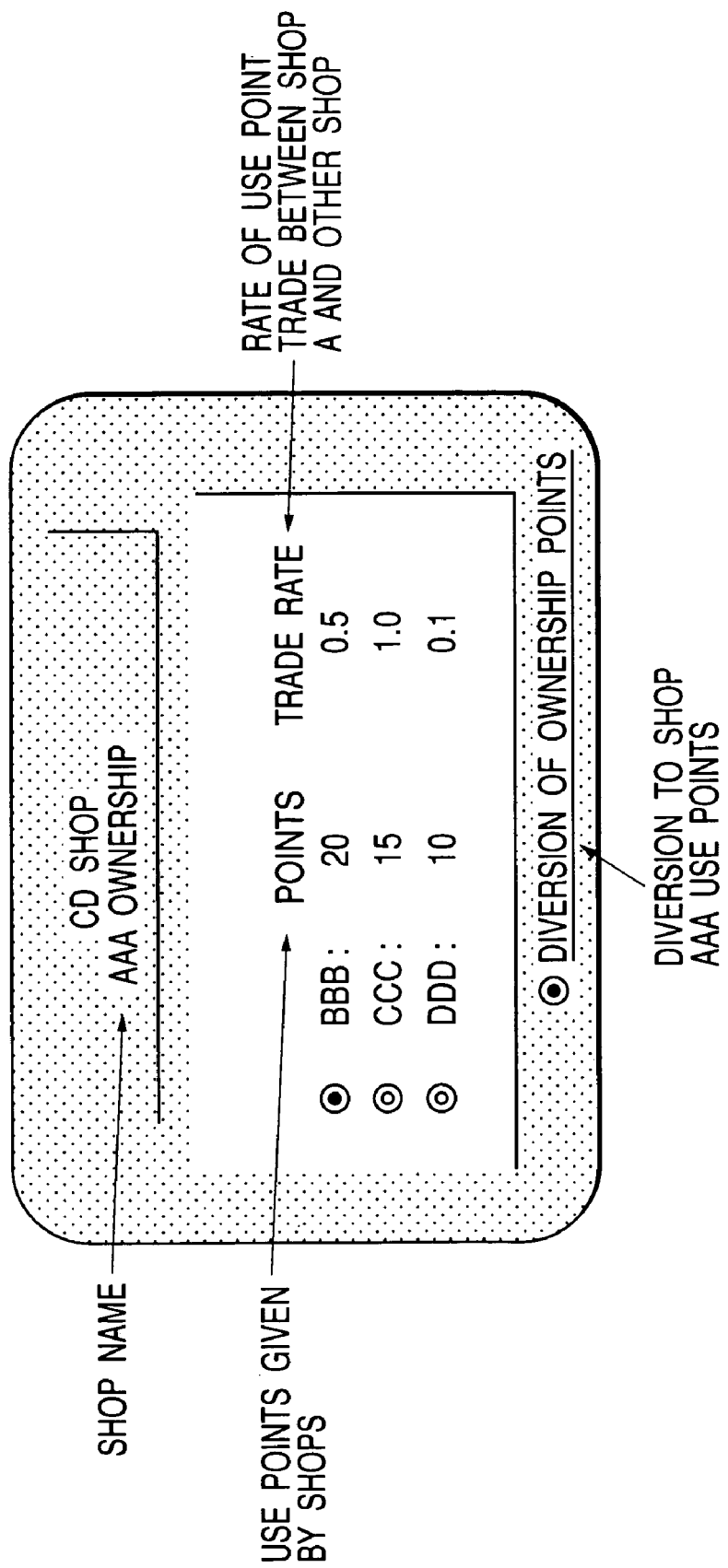
FIG. 9 is a plan diagram showing an example of a picture denoting use points and indicated on the display of a mobile user terminal device in FIG. 1.

The mobile user terminal device 2 can get information from the members server 4 which represents shops in an ownership group, use points given by the shops, and rates of trades among the use points. The mobile user terminal device 2 can indicate, on its display, a list of the shops in the ownership group and a list of the use points given by the shops. Furthermore, the mobile user terminal device 2 can indicate the trade rates on its display. FIG. 9 shows an example of the related picture indicated on the display. As shown in FIG. 9, the indicated picture has a headline portion which denotes that a shop "AAA" is a subject. The indicated picture also denotes shops "BBB", "CCC", and "DDD" which are in the same ownership group as that containing the shop "AAA". Furthermore, the indicated picture denotes use points given by the shops "BBB", "CCC", and "DDD" which are collected by the user. In addition, the indicated picture denotes a rate of trade between use points given by the shop "AAA" and use points given by the shop "BBB", a rate of trade between use points given by the shop "AAA" and use points given by the shop "CCC", and a rate of trade between use points given by the shop "AAA" and use points given by the shop "DDD". In the case where the use points given by the shop "BBB" are "20" and the rate of trade between use points given by the shop "AAA" and use points given by the shop "BBB" is "0.5", the user can divert the "20" shop-BBB use points to the shop-AAA use points and hence increase the shop-AAA use points by "10". The user can divert not only the shop-BBB use points but also the shop-CCC use points and the shop DDD use points to the shop-AAA use points.

Figure 10:
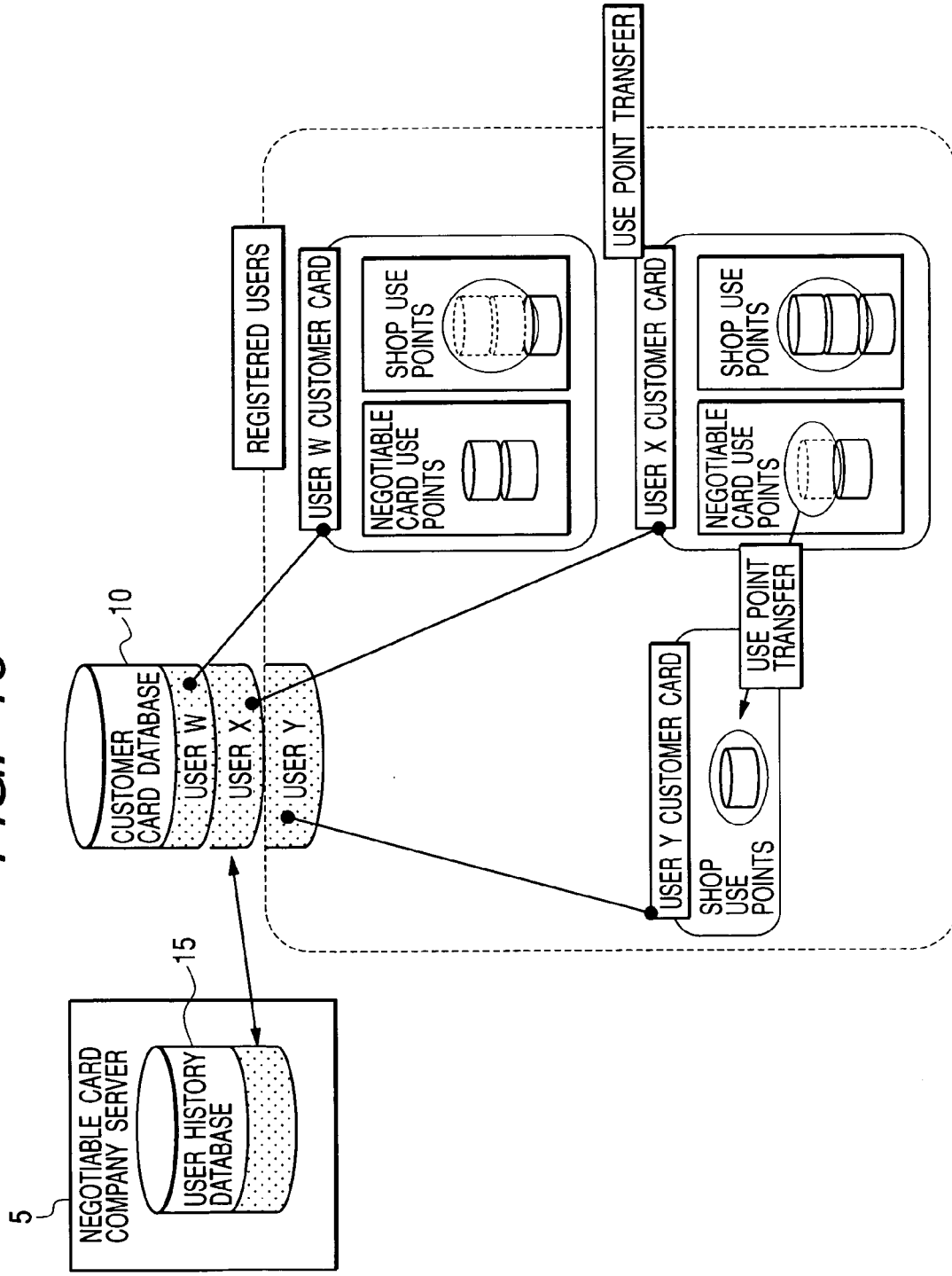
FIG. 10 is a diagram of conditions in which use points are transferred among registered users.

Use points may be exchanged or interchanged among users. A user may give unnecessary use points to another user. With reference to FIG. 10, a user "W" gives shop-A use points of "2" to a user "X", and the user "X" gives negotiable-card-related points of "1" to a user "Y".

Preferably, use points are exchanged among users with the concurrence of them. The members server 4 may provide a trading site via which use points can be exchanged or transferred among users. In the case where use points are exchanged or transferred among users in such a way, a signal representative of the use-point exchange or transfer is inputted into the shop-side terminal device 3 before being sent to the members server 4 and the negotiable-card company server 5. Negotiable-card-related use points and shop-related use points represented by information in the customer card database 10 in the members server 4 and information in the user history database 15 in the negotiable-card company server 5 are updated in accordance with the use-point exchange (transfer) signal.

The members server 4 can derive the address of the non-mobile user terminal device 1 or the mobile user terminal device 2 from the electronic customer card of each registered user. Therefore, the members server 4 can send information about the shop side to the user side (the non-mobile user terminal device 1 or the mobile user terminal device 2) when a request for the transmission of the information is received from the shop side. For example, the shop-side terminal device 3 sends information about an advertisement to the members server 4, and the members server 4 delivers the advertisement information to the non-mobile user terminal devices 1 or the mobile user terminal devices 2 possessed by registered users.

The members server 4 may be incorporated in the negotiable-card company server 5. The electronic customer card of a user and information about a negotiable card possessed by the user may be combined into an electronic multi-purpose card. The non-mobile user terminal device 1 loaded with the electronic multi-purpose card, the mobile user terminal device 2 loaded with the electronic multi-purpose card, an IC card storing the electronic multi-purpose card, or an external memory storing the electronic multi-purpose card may be used instead of a negotiable card.

Each of the non-mobile user terminal device 1, the mobile user terminal device 2, the shop-side terminal device 3, the members server 4, the negotiable-card company server 5, and the server of the on-line shop 7 operates in accordance with a computer program stored in its internal memory. The computer program has segments (subroutines).

Figure 11:
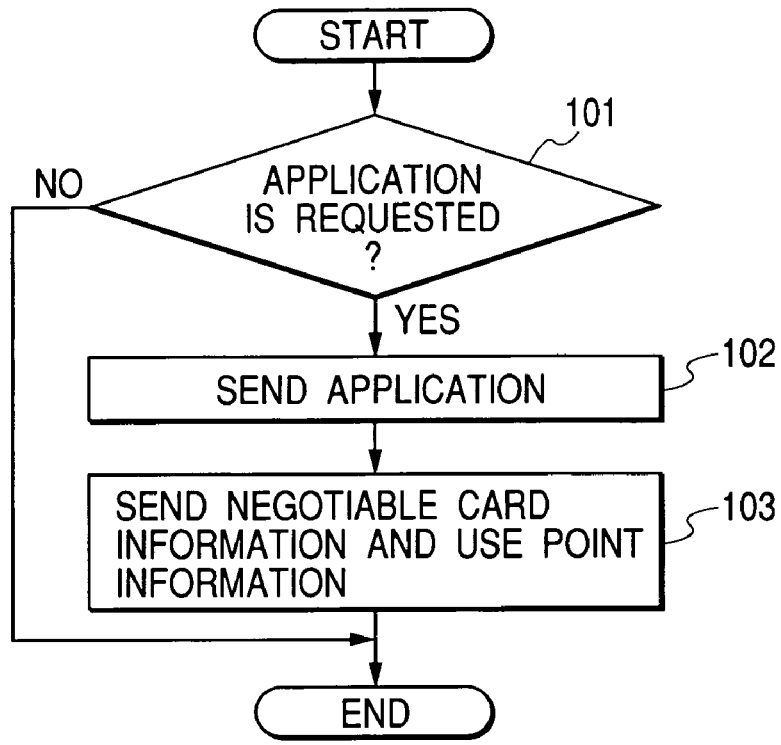
FIG. 11 is a flowchart of a first segment of a computer program for a shop-side terminal device in FIG. 1.

FIG. 11 is a flowchart of a first segment (a first subroutine) of the computer program for the shop-side terminal device 3 which relates to the shop member registration. The program segment in FIG. 11 is iterated at a prescribed period. As shown in FIG. 11, a first step 101 of the program segment decides whether or not a shop member registration application is requested. When a shop member registration application is requested, the program advances from the step 101 to a step 102. Otherwise, the program exits from the step 101, and then the current execution cycle of the program segment ends. The step 102 sends information of the shop member registration application to the members server 4. A step 103 following the step 102 sends, to the members server 4, information of a type or types of negotiable cards acceptable and handleable by the shop side and also information about use points given by the shop side. After the step 103, the current execution cycle of the program segment ends.

Figure 12:
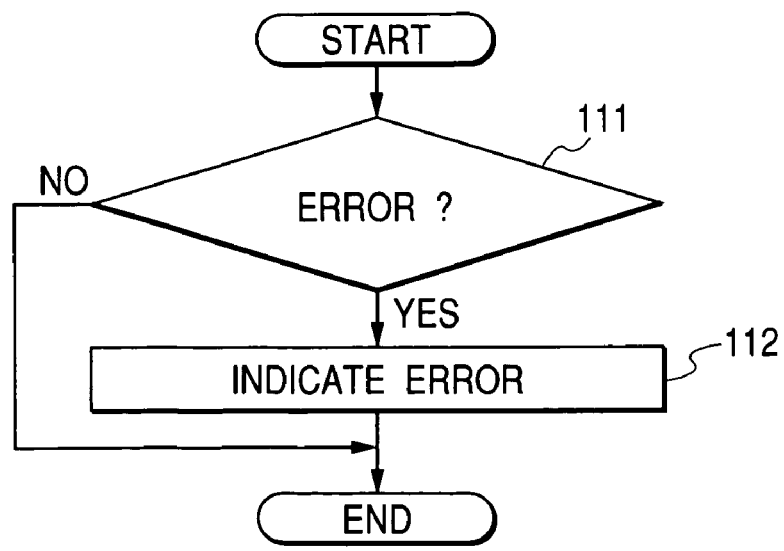
FIG. 12 is a flowchart of a second segment of the computer program for the shop-side terminal device in FIG. 1.

FIG. 12 is a flowchart of a second segment (a second subroutine) of the computer program for the shop-side terminal device 3 which relates to the shop member registration. The program segment in FIG. 12 is iterated at a prescribed period. As shown in FIG. 12, a first step 111 of the program segment decides whether or not a signal representative of an error message is received from the members server 4. When a signal representative of an error message is received, the program advances from the step 111 to a step 112. Otherwise, the program exits from the step 111, and then the current execution cycle of the program segment ends. The step 112 controls the display to indicate the received error message. After the step 112, the current execution cycle of the program segment ends.

Figure 13:
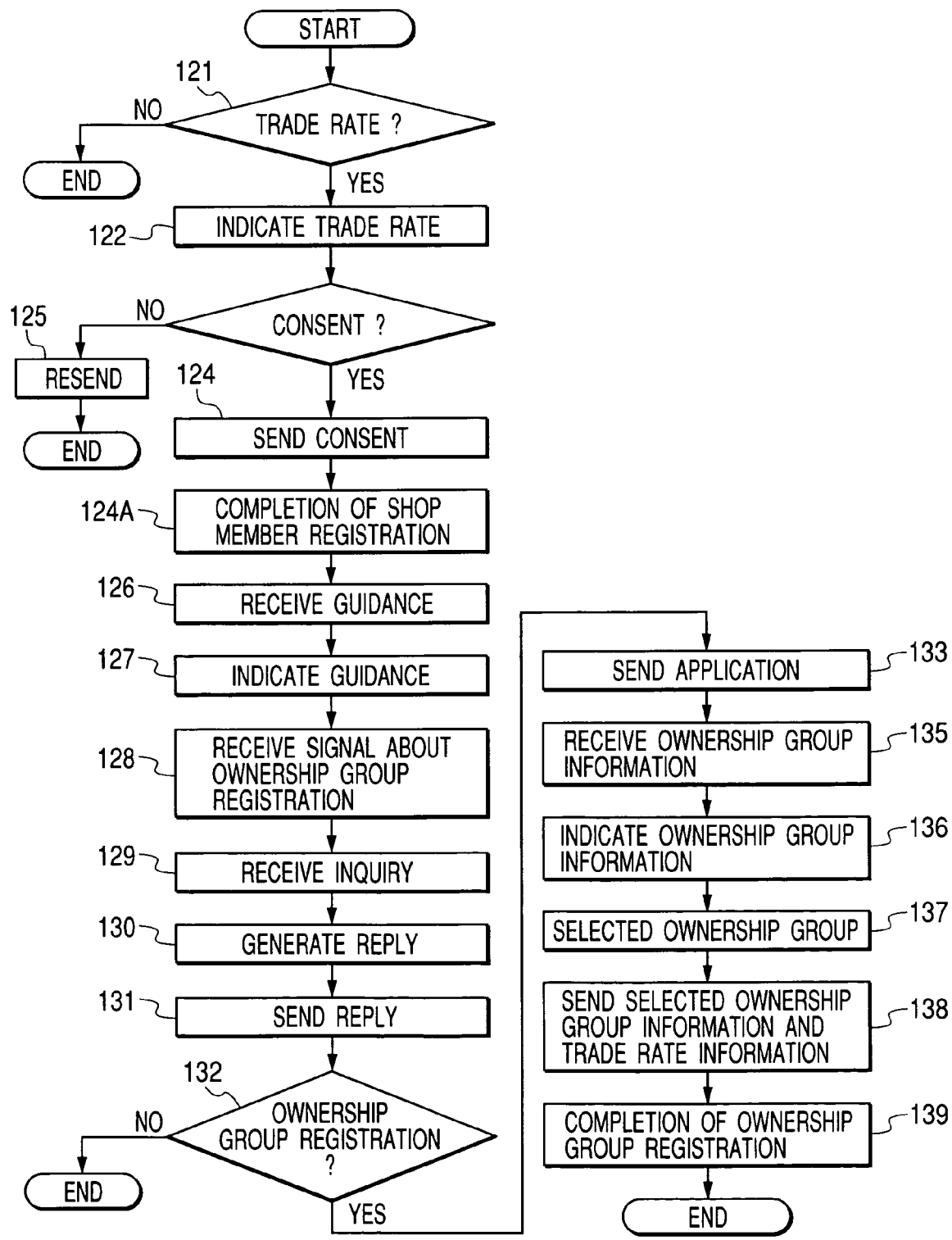
FIG. 13 is a flowchart of a third segment of the computer program for the shop-side terminal device in FIG. 1.

FIG. 13 is a flowchart of a third segment (a third subroutine) of the computer program for the shop-side terminal device 3 which relates to the shop member registration. The program segment in FIG. 13 is iterated at a prescribed period. As shown in FIG. 13, a first step 121 of the program segment decides whether or not information about a trade rate is received from the members server 4. When information about a trade rate is received, the program advances from the step 121 to a step 122. Otherwise, the program exits from the step 121, and then the current execution cycle of the program segment ends. The step 122 controls the display to indicate the trade rate. A step 123 following the step 122 waits for a signal inputted which represents whether or not the trade rate should be consented to. The step 123 decides the state of the inputted signal. When the inputted signal represents that the trade rate should be consented to, the program advances from the step 123 to a step 124. Otherwise, the program advances from the step 123 to a step 125.

The step 124 sends a signal representative of the consent to the members server 4. The step 125 resends the use-point-related information to the members server 4 so that the members server 4 will repeat the trade-rate setting procedure. After the step 125, the current execution cycle of the program segment ends. A step 124A following the step 124 receives, from the members server 4, a signal representing that the shop member registration is completed. The step 124A controls the display to indicate the completion of the shop member registration. A step 126 following the step 124A receives guidance information about an ownership group from the members server 4. A step 127 subsequent to the step 126 controls the display to indicate the guidance information. A step 128 following the step 127 waits for a signal inputted which represents whether or not ownership group registration should be performed. The step 128 decides the state of the inputted signal. A step 129 subsequent to the step 128 receives, from the members server 4, a signal representative of an inquiry as to whether or not the shop side will perform ownership group registration. A step 130 following the step 129 generates a signal representative of a reply to the inquiry in accordance with the state of the inputted signal handled by the step 128. A step 131 subsequent to the step 130 sends the reply signal to the members server 4.

A step 132 following the step 131 decides whether or not ownership group registration should be performed by referring to the state of the inputted signal handled by the step 128. When ownership group registration should be performed, the program advances from the step 132 to a step 133. Otherwise, the program exits from the step 132, and then the current execution cycle of the program segment ends. The step 133 sends information of an ownership group registration application to the members server 4. A step 135 subsequent to the step 133 receives, from the members server 4, ownership-group-related information containing information representative of a list of other shops registered with each of ownership groups and also information about the trade rates in the ownership group. A step 136 following the step 135 controls the display to indicate the ownership-group-related information. A step 137 subsequent to the step 136 waits for a signal inputted which represents which of the ownership groups with which registration should be done. Thus, the inputted signal indicates selected one among the ownership groups. A step 138 following the step 137 sends, to the members server 4, information about the selected ownership group and also information about the trade rates in the selected ownership group. A step 139 subsequent to the step 138 receives, from the members server 4, a signal representing that the ownership group registration is completed. The step 139 controls the display to indicate the completion of the ownership group registration. After the step 139, the current execution cycle of the program segment ends.

Figure 14:
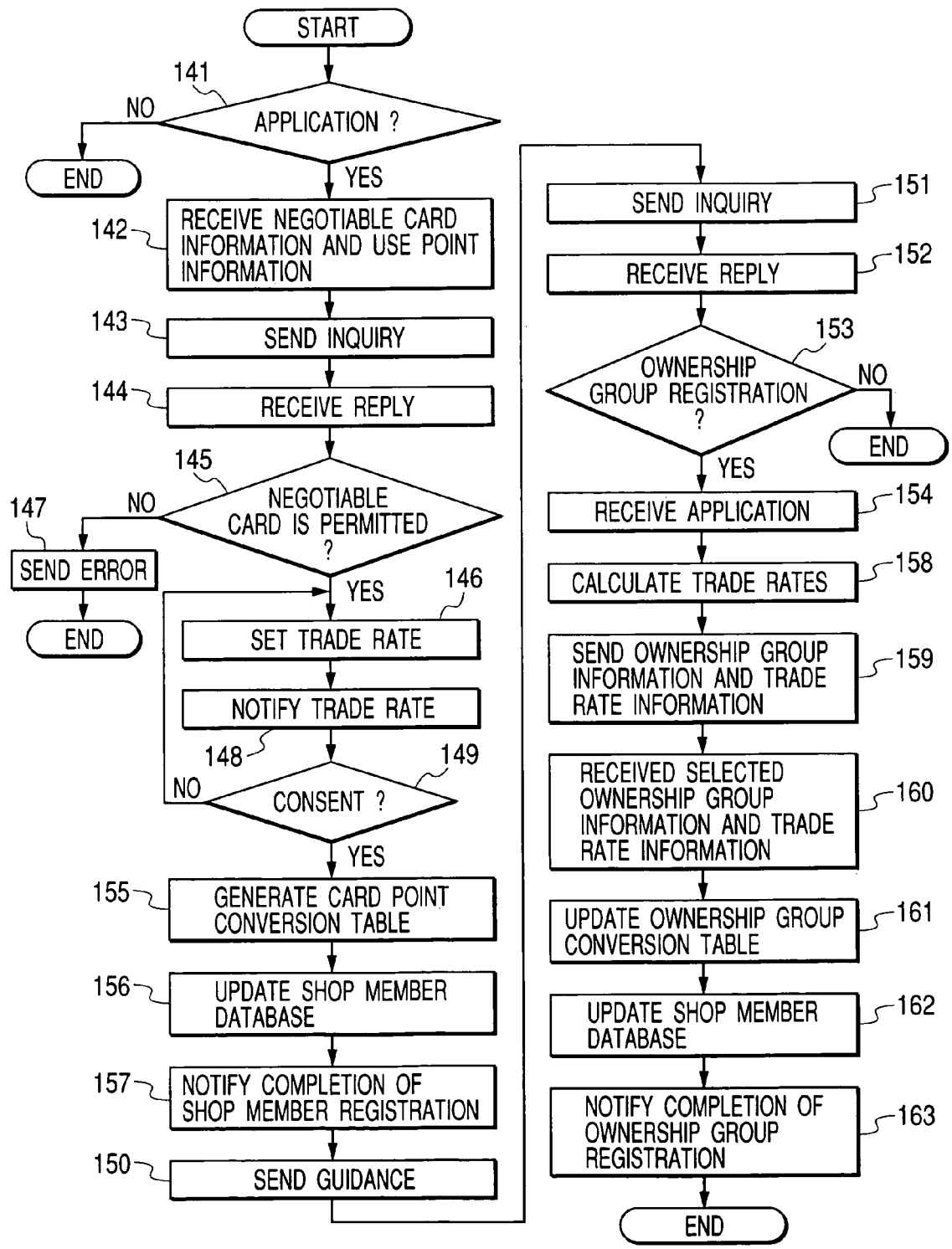
FIG. 14 is a flowchart of a first segment of a computer program for a members server in FIG. 1.

FIG. 14 is a flowchart of a first segment (a first subroutine) of the computer program for the members server 4 which relates to the shop member registration. The program segment in FIG. 14 is iterated at a prescribed period. As shown in FIG. 14, a first step 141 of the program segment decides whether or not information of a shop member registration application is received from the shop side. When information of a shop member registration application is received, the program advances from the step 141 to a step 142. Otherwise, the program exits from the step 141, and then the current execution cycle of the program segment ends. The step 142 receives, from the shop side, information of a type or types of negotiable cards acceptable and handleable by the shop side and also information about use points given by the shop side.

A step 143 following the step 142 inquires of the negotiable-card company server 5 as to whether or not the notified type or types of negotiable cards are permitted to be employed in the shop side in question. A step 144 subsequent to the step 143 receives a reply to the inquiry from the negotiable-card company server 5. A step 145 following the step 144 refers to the reply and thereby decides whether or not the notified type or types of negotiable cards are permitted to be employed in the shop side in question. When the notified type or types of negotiable cards are permitted to be employed in the shop side in question, the program advances from the step 145 to a step 146. Otherwise, the program advances from the step 145 to a step 147. The step 147 sends a signal representative of an error message to the shop side. The step 146 compares the use points given to users when they make purchases at the shop side in question and the use points given to users when they employ negotiable cards. The use points given to users when they make purchases at the shop side in question are referred to as the first use points or the shop-related use points. On the other hand, the use points given to users when they employ negotiable cards are referred to as the second use points or the negotiable-card-related use points. The step 146 sets a rate of trade between the first use points (the shop-related use points) and the second use points (the negotiable-card-related use points) in accordance with the comparison result.

A step 148 following the step 146 sends, to the shop side, information about the trade rate set at the step 146. A step 149 subsequent to the step 148 decides which of (1) a signal representing a consent to the trade rate and (2) the use-point-related information is received from the shop side. When the use-point-related information is received, the program returns from the step 149 to the step 146. In this case, the step 146 sets a trade rate different from the first one. When a signal representing a consent to the trade rate is received, the program advances from the step 149 to a step 155. The step 155 generates a card point conversion table 12 storing information about the trade rate. A step 156 following the step 155 loads the shop member database 11 with information about the shop side in relation to the generated card point conversion table 12. A step 157 subsequent to the step 156 sends, to the shop side, a signal representing that the shop member registration is completed.

A step 150 following the step 157 sends guidance information about an ownership group to the shop side. A step 151 following the step 150 inquires of the shop side as to whether or not the shop side will perform ownership group registration. A step 152 subsequent to the step 151 receives a reply to the inquiry from the shop side. A step 153 following the step 152 refers to the reply and thereby decides whether or not the shop side will perform the ownership group registration. When the shop side will perform the ownership group registration, the program advances from the step 153 to a step 154. Otherwise, the program exits from the step 153, and then the current execution cycle of the program segment ends.

The step 154 receives information of an ownership group registration application from the shop side. A step 158 following the step 154 accesses the card point conversion table 12 and the ownership group conversion table 13. The step 158 calculates rates of trades among use points in shop sides within each of ownership groups by referring to the accessed tables 12 and 13. A step 159 subsequent to the step 158 sends, to the shop side, ownership-group-related information containing information representative of a list of other shops registered with each of the ownership groups and also information about the trade rates in each of the ownership groups. A step 160 following the step 159 receives, from the members server 4, information about the selected ownership group and also information about the trade rates in the selected ownership group. A step 161 subsequent to the step 160 registers the shop side with the ownership group (the selected ownership group) defined in the ownership group conversion table 13. The step 161 also registers the trade rates concerning the newly-registered shop side with the ownership group conversion table 13. Thus, the step 161 registers the shop side and the trade rates with the ownership group conversion table 13. Therefore, the step 161 updates the ownership group conversion table 13. A step 162 following the step 161 writes the ownership group registration in the shop-side information within the shop member database 11. Thus, the step 162 updates the shop member database 11. A step 163 subsequent to the step 162 sends, to the shop side, a signal representing that the ownership group registration is completed. After the step 163, the current execution cycle of the program segment ends.

Figure 15:
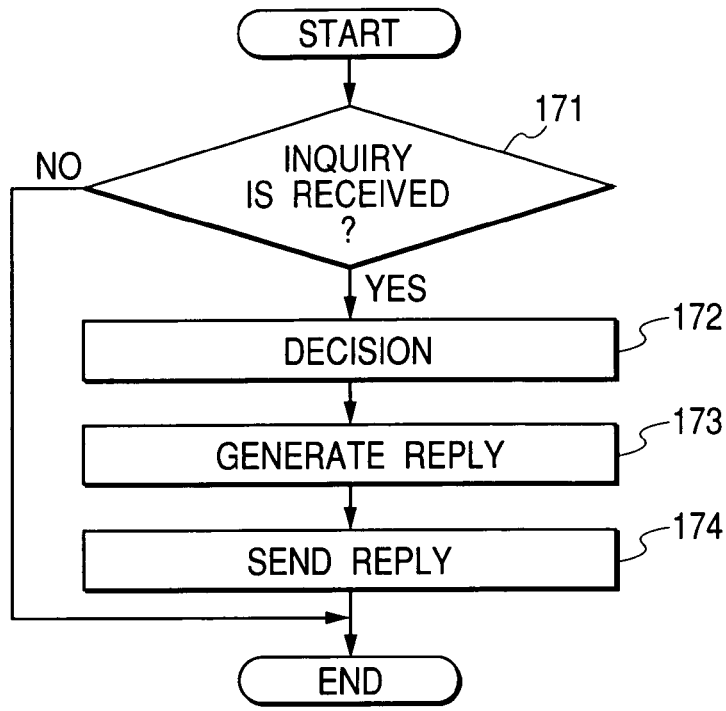
FIG. 15 is a flowchart of a first segment of a computer program for a negotiable-card company server in FIG. 1.

FIG. 15 is a flowchart of a first segment (a first subroutine) of the computer program for the negotiable-card company server 5 which relates to the shop member registration. The program segment in FIG. 15 is iterated at a prescribed period. As shown in FIG. 15, a first step 171 of the program segment decides whether or not a signal is received from the members server 4 which represents the notified type or types of negotiable cards, and also represents an inquiry as to whether or not the notified type or types of negotiable cards are permitted to be employed in the shop side in question. When the inquiry signal is received, the program advances from the step 171 to a step 172. Otherwise, the program exits from the step 171, and then the current execution cycle of the program segment ends. The step 172 refers to the user history database 15 and thereby decides whether or not the notified type or types of negotiable cards are permitted to be employed in the shop side in question. A step 173 following the step 172 generates a reply to the inquiry in accordance with the result of the decision by the step 172. A step 174 subsequent to the step 173 sends, to the members server 4, a signal representing the reply to the inquiry. After the step 174, the current execution cycle of the program segment ends.

Figure 16:
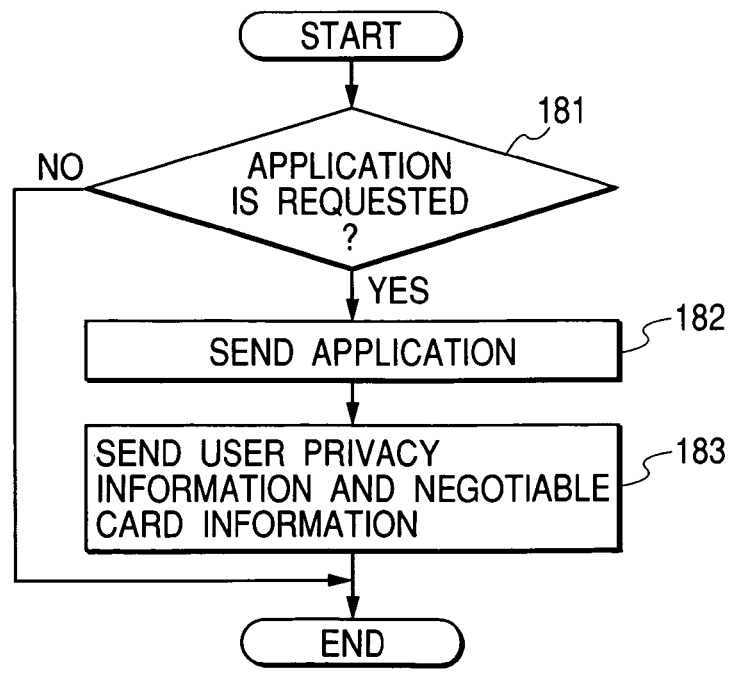
FIG. 16 is a flowchart of a first segment of a computer program for a non-mobile user terminal device or a mobile user terminal device in FIG. 1.

FIG. 16 is a flowchart of a first segment (a first subroutine) of the computer program for the non-mobile user terminal device 1 or the mobile user terminal device 2 which relates to the user registration. The program segment in FIG. 16 is iterated at a prescribed period. As shown in FIG. 16, a first step 181 of the program segment decides whether or not a user registration application is requested. When a user registration application is requested, the program advances from the step 181 to a step 182. Otherwise, the program exits from the step 181, and then the current execution cycle of the program segment ends. The step 182 sends information of the user registration application to the members server 4. A step 183 following the step 182 sends, to the members server 4, information about the privacy of the user and also information about the type and ID number of a negotiable card possessed by the user. After the step 183, the current execution cycle of the program segment ends.

Figure 17:
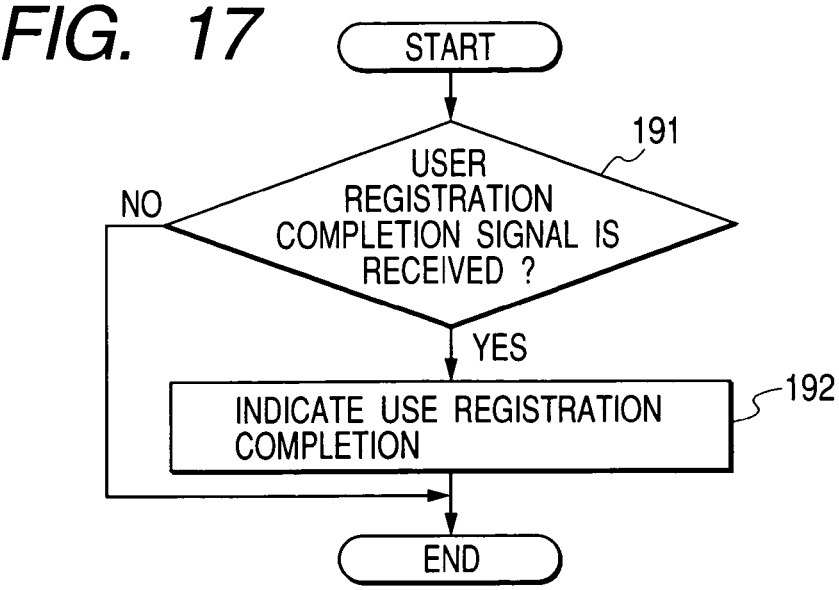
FIG. 17 is a flowchart of a second segment of the computer program for the non-mobile user terminal device or the mobile user terminal device in FIG. 1.

FIG. 17 is a flowchart of a second segment (a second subroutine) of the computer program for the non-mobile user terminal device 1 or the mobile user terminal device 2 which relates to the user registration. The program segment in FIG. 17 is iterated at a prescribed period. As shown in FIG. 17, a first step 191 of the program segment decides whether or not a signal is received from the members server 4 which represents that the user registration is completed. When the user-registration-completion signal is received, the program advances from the step 191 to a step 192. Otherwise, the program exits from the step 191, and then the current execution cycle of the program segment ends. The step 192 controls the display to indicate the completion of the user registration. After the step 192, the current execution cycle of the program segment ends.

Figure 18:
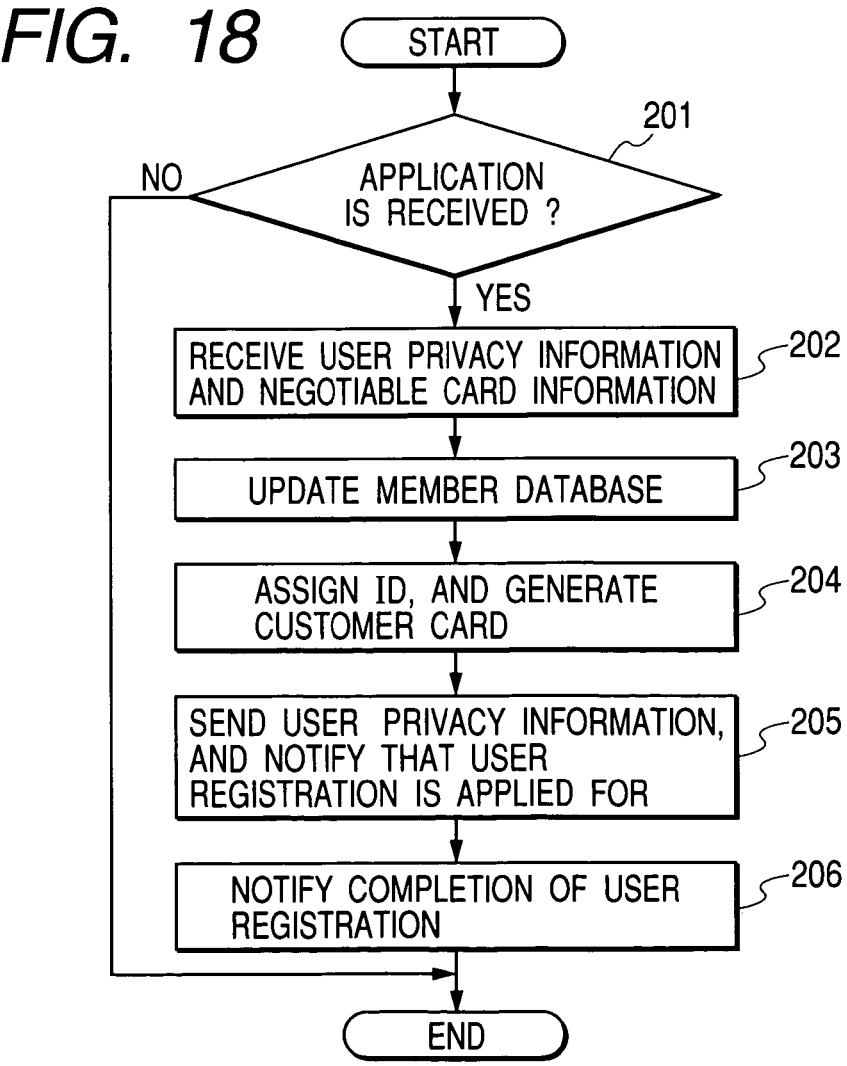
FIG. 18 is a flowchart of a second segment of the computer program for the members server in FIG. 1.

FIG. 18 is a flowchart of a second segment (a second subroutine) of the computer program for the members server 4 which relates to the user registration. The program segment in FIG. 18 is iterated at a prescribed period. As shown in FIG. 18, a first step 201 of the program segment decides whether or not information of a user registration application is received from the user side. When information of a user registration application is received, the program advances from the step 201 to a step 202. Otherwise, the program exits from the step 201, and then the current execution cycle of the program segment ends. The step 202 receives, from the user side, information about the privacy of the user and also information about the type and ID number of a negotiable card possessed by the user. A step 203 following the step 202 stores the received user privacy information and the received user negotiable-card information in the member database 9. Thus, the step 203 updates the member database 9. A step 204 subsequent to the step 203 assigns an ID number (a user ID) to the newly-registered user. The step 204 derives use points from, for example, the user negotiable-card information, and totals up the derived use points. The step 204 generates an electronic customer card (customer information) of the newly-registered user from the user privacy information, the total of the use points, and the ID number of the newly-registered user. The step 204 stores the generated electronic customer card into the customer card database 10. A step 205 following the step 204 sends the user privacy information to the negotiable-card company server 5. In addition, the step 205 notifies the negotiable-card company server 5 that the user registration is applied for. A step 206 subsequent to the step 205 sends, to the user side, a signal representing that the user registration is completed. After the step 206, the current execution cycle of the program segment ends.

Figure 19:
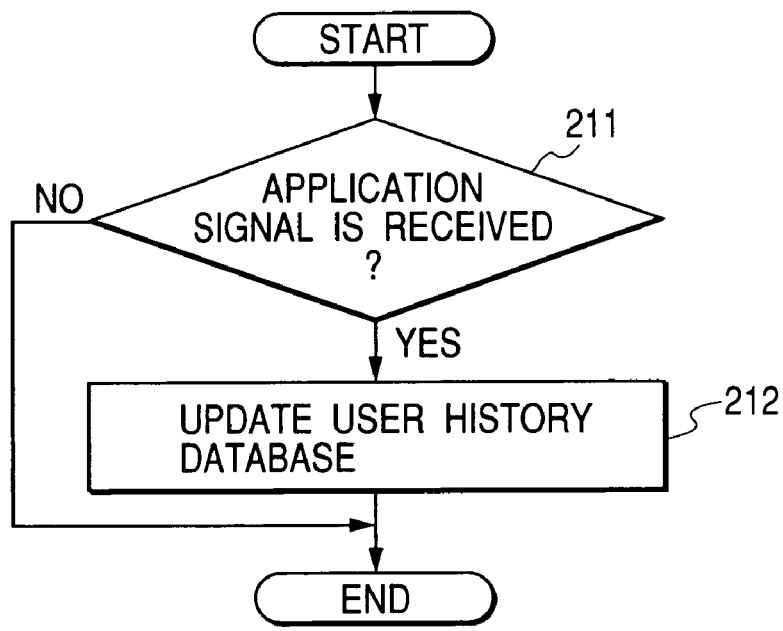
FIG. 19 is a flowchart of a second segment of the computer program for the negotiable-card company server in FIG. 1.

FIG. 19 is a flowchart of a second segment (a second subroutine) of the computer program for the negotiable-card company server 5 which relates to the user registration. The program segment in FIG. 19 is iterated at a prescribed period. As shown in FIG. 19, a first step 211 of the program segment decides whether or not a signal is received from the members server 4 which represents user privacy information, and which represents that the user registration is applied for. When the user-privacy and user-registration-application signal is received, the program advances from the step 211 to a step 212. Otherwise, the program exits from the step 211, and then the current execution cycle of the program segment ends. The step 212 adds, to the user privacy information in the user history database 15, the received user privacy information and also the received information representing that the new user performs the user registration. Accordingly, the step 212 updates the user privacy information in the user history database 15. After the step 212, the current execution cycle of the program segment ends.

Figure 20:
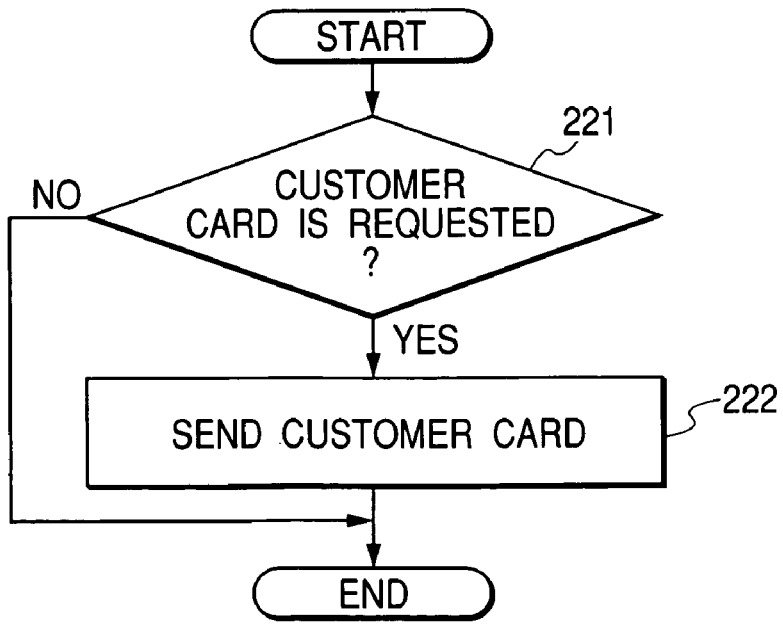
FIG. 20 is a flowchart of a third segment of the computer program for the members server in FIG. 1.

FIG. 20 is a flowchart of a third segment (a third subroutine) of the computer program for the members server 4 which relates to the case where a registered user makes a purchase at a shop without using a negotiable card and receives the services provided by the members server 4. The program segment in FIG. 20 is iterated at a prescribed period. As shown in FIG. 20, a first step 221 of the program segment decides whether or not an electronic customer card is requested. When an electronic customer card is requested, the program advances from the step 221 to a step 222. Otherwise, the program exits from the step 221, and then the current execution cycle of the program segment ends. The step 222 sends the requested electronic customer card to the user side. After the step 222, the current execution cycle of the program segment ends.

Figure 21:
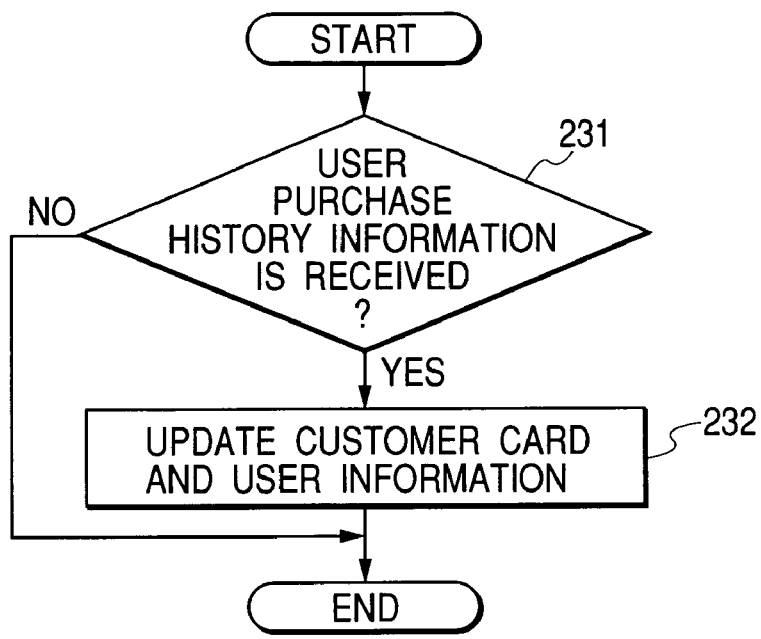
FIG. 21 is a flowchart of a fourth segment of the computer program for the members server in FIG. 1.

FIG. 21 is a flowchart of a fourth segment (a fourth subroutine) of the computer program for the members server 4 which relates to the case where a registered user makes a purchase at a shop without using a negotiable card and receives the services provided by the members server 4. The program segment in FIG. 21 is iterated at a prescribed period. As shown in FIG. 21, a first step 231 of the program segment decides whether or not customer purchase history information is received from the shop-side terminal device 3. When customer purchase history information is received, the program advances from the step 231 to a step 232. Otherwise, the program exits from the step 231, and then the current execution cycle of the program segment ends. The step 232 updates the electronic customer card of the user in the customer card database 10 and also the information about the user in response to the received customer purchase history information. After the step 232, the current execution cycle of the program segment ends.

Figure 22:
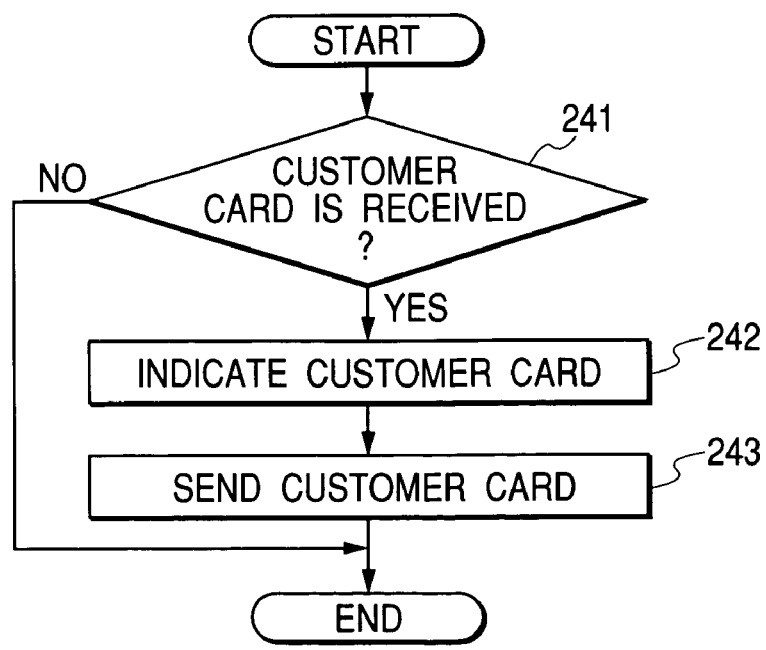
FIG. 22 is a flowchart of a third segment of the computer program for the non-mobile user terminal device or the mobile user terminal device in FIG. 1.

FIG. 22 is a flowchart of a third segment (a third subroutine) of the computer program for the non-mobile user terminal device 1 or the mobile user terminal device 2 which relates to the case where a registered user makes a purchase at a shop without using a negotiable card and receives the services provided by the members server 4. The program segment in FIG. 22 is iterated at a prescribed period. As shown in FIG. 22, a first step 241 of the program segment decides whether or not a requested electronic customer card is received from the members server 4. When the requested electronic customer card is received, the program advances from the step 241 to a step 242. Otherwise, the program exits from the step 241, and then the current execution cycle of the program segment ends. The step 242 controls the display to indicate the received electronic customer card. A step 243 following the step 242 sends the electronic customer card to the shop-side terminal device 3. After the step 243, the current execution cycle of the program segment ends.

Figure 23:
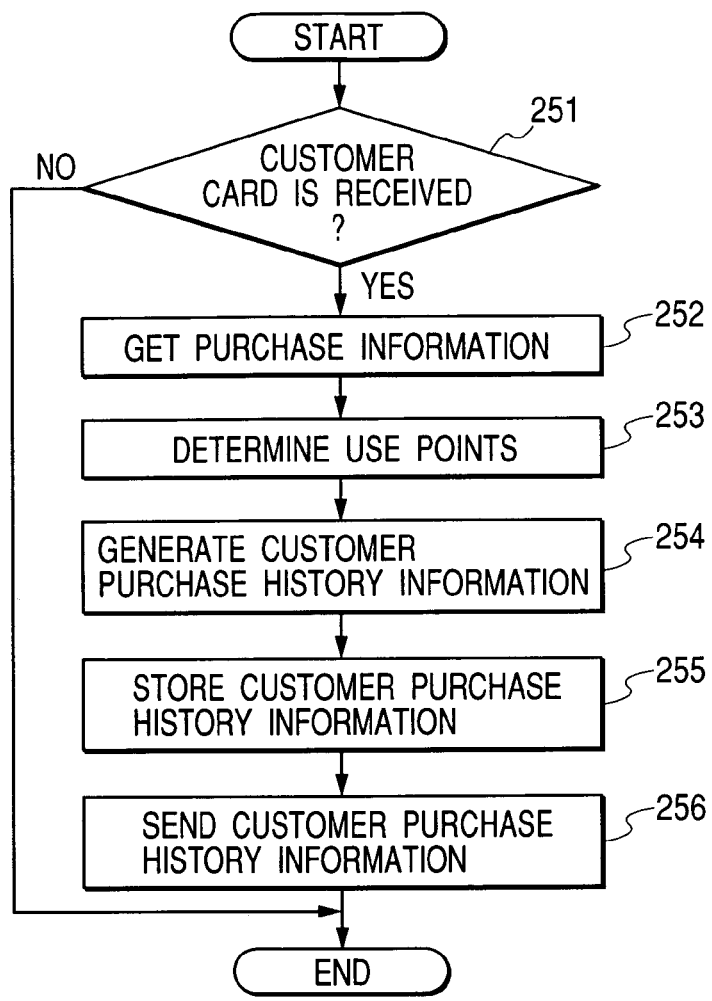
FIG. 23 is a flowchart of a fourth segment of the computer program for the shop-side terminal device in FIG. 1.

FIG. 23 is a flowchart of a fourth segment (a fourth subroutine) of the computer program for the shop-side terminal device 3 which relates to the case where a registered user makes a purchase at a shop without using a negotiable card and receives the services provided by the members server 4. The program segment in FIG. 23 is iterated at a prescribed period. As shown in FIG. 23, a first step 251 of the program segment decides whether or not an electronic customer card is received from the user side. When an electronic customer card is received, the program advances from the step 251 to a step 252. Otherwise, the program exits from the step 251, and then the current execution cycle of the program segment ends. The step 252 gets purchase information which represents the user's order, the name of an ordered article, and the price thereof. A step 253 following the step 252 refers to the purchase information and thereby determines shop-related use points given to the user. A step 254 subsequent to the step 253 derives the user's ID from the electronic customer card. The step 254 generates customer purchase history information in relation to the user's ID number, the purchase information, and the determined use points. A step 255 following the step 254 stores the customer purchase history information into a memory. A step 256 subsequent to the step 255 sends the customer purchase history information to the members server 4. After the step 256, the current execution cycle of the program segment ends.

Figure 24:
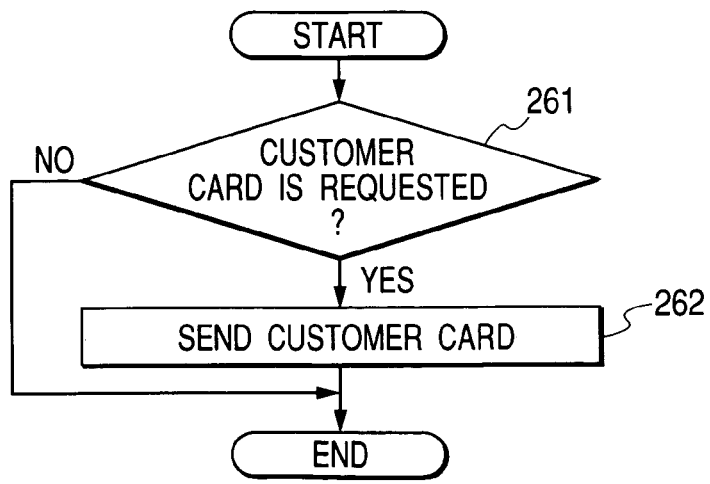
FIG. 24 is a flowchart of a fifth segment of the computer program for the members server in FIG. 1.

FIG. 24 is a flowchart of a fifth segment (a fifth subroutine) of the computer program for the members server 4 which relates to the case where a registered user makes a purchase at a shop with using a negotiable card and receives the services provided by the members server 4. The program segment in FIG. 24 is iterated at a prescribed period. As shown in FIG. 24, a first step 261 of the program segment decides whether or not an electronic customer card is requested. When an electronic customer card is requested, the program advances from the step 261 to a step 262. Otherwise, the program exits from the step 261, and then the current execution cycle of the program segment ends. The step 262 sends the requested electronic customer card to the user side. After the step 262, the current execution cycle of the program segment ends.

Figure 25:
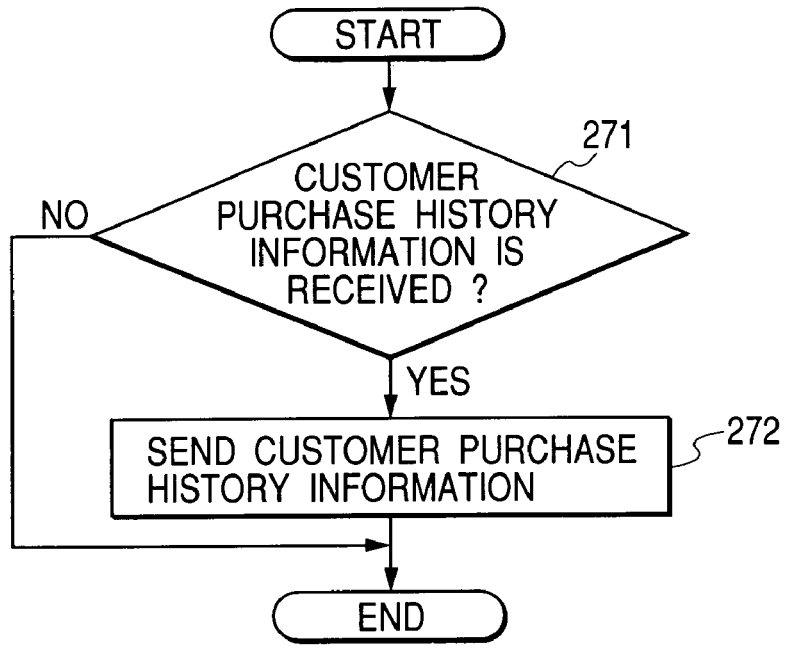
FIG. 25 is a flowchart of a sixth segment of the computer program for the members server in FIG. 1.

FIG. 25 is a flowchart of a sixth segment (a sixth subroutine) of the computer program for the members server 4 which relates to the case where a registered user makes a purchase at a shop with using a negotiable card and receives the services provided by the members server 4. The program segment in FIG. 25 is iterated at a prescribed period. As shown in FIG. 25, a first step 271 of the program segment decides whether or not customer purchase history information is received from the shop-side terminal device 3. When customer purchase history information is received, the program advances from the step 271 to a step 272. Otherwise, the program exits from the step 271, and then the current execution cycle of the program segment ends. The step 272 refers to the negotiable-card-type information piece in the received customer purchase history information, and sends at least related portions of the customer purchase history information to the negotiable-card company server 5. After the step 272, the current execution cycle of the program segment ends.

Figure 26:
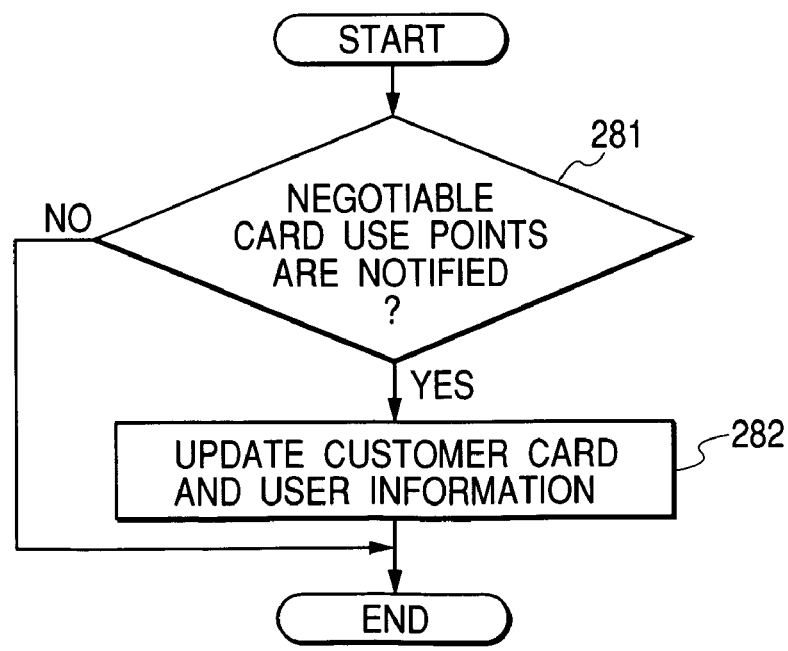
FIG. 26 is a flowchart of a seventh segment of the computer program for the members server in FIG. 1.

FIG. 26 is a flowchart of a seventh segment (a seventh subroutine) of the computer program for the members server 4 which relates to the case where a registered user makes a purchase at a shop with using a negotiable card and receives the services provided by the members server 4. The program segment in FIG. 26 is iterated at a prescribed period. As shown in FIG. 26, a first step 281 of the program segment decides whether or not a signal representative of updated negotiable-card-related use points is received from the negotiable-card company server 5. When a signal representative of updated negotiable-card-related use points is received, the program advances from the step 281 to a step 282. Otherwise, the program exits from the step 281, and then the current execution cycle of the program segment ends. The step 282 updates the electronic customer card of the present user in the customer card database 10 and also the information about the present user in response to the notified negotiable-card-related use points and also the customer purchase history information. After the step 282, the current execution cycle of the program segment ends.

FIG. 27 is a flowchart of a fourth segment (a fourth subroutine) of the computer program for the non-mobile user terminal device 1 or the mobile user terminal device 2 which relates to the case where a registered user makes a purchase at a shop with using a negotiable card and receives the services provided by the members server 4. The program segment in FIG. 27 is iterated at a prescribed period. As shown in FIG. 27, a first step 291 of the program segment decides whether or not a requested electronic customer card is received from the members server 4. When the requested electronic customer card is received, the program advances from the step 291 to a step 292. Otherwise, the program exits from the step 291, and then the current execution cycle of the program segment ends. The step 292 controls the display to indicate the received electronic customer card. A step 293 following the step 292 sends the electronic customer card to the shop-side terminal device 3. After the step 293, the current execution cycle of the program segment ends.

FIG. 28 is a flowchart of a fifth segment (a fifth subroutine) of the computer program for the shop-side terminal device 3 which relates to the case where a registered user makes a purchase at a shop with using a negotiable card and receives the services provided by the members server 4. The program segment in FIG. 28 is iterated at a prescribed period. As shown in FIG. 28, a first step 301 of the program segment decides whether or not an electronic customer card is received from the user side. When an electronic customer card is received, the program advances from the step 301 to a step 302. Otherwise, the program exits from the step 301, and then the current execution cycle of the program segment ends. The step 302 gets purchase information which represents the user's order, the name of an ordered article, and the price thereof. A step 303 following the step 302 refers to the purchase information and thereby determines shop-related use points given to the user. A step 304 subsequent to the step 303 derives the user's ID from the electronic customer card. The step 304 generates customer purchase history information in relation to the user's ID number, the purchase information, and the determined use points. The step 304 adds specified information pieces to the customer purchase history information. First one of the specified information pieces represents that a purchased article is paid for by employing a negotiable card. Second one of the specified information pieces represents the type of the employed negotiable card. Third one of the specified information pieces represents the ID number of the employed negotiable card. A step 305 following the step 304 stores the customer purchase history information into a memory. A step 306 subsequent to the step 305 sends the customer purchase history information to the members server 4. After the step 306, the current execution cycle of the program segment ends.

Figure 29:
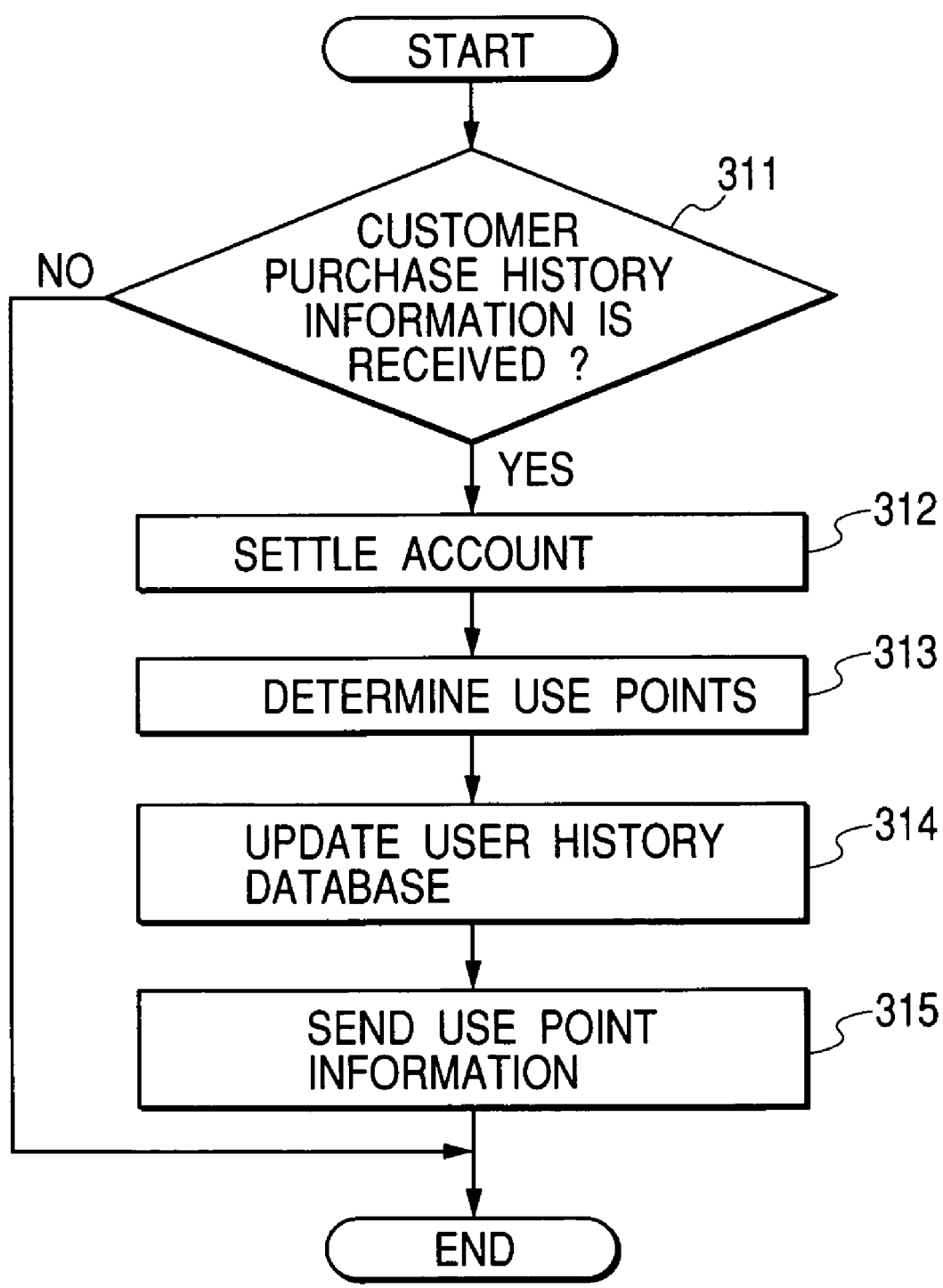
FIG. 29 is a flowchart of a third segment of the computer program for the negotiable-card company server in FIG. 1.

FIG. 29 is a flowchart of a third segment (a third subroutine) of the computer program for the negotiable-card company server 5 which relates to the case where a registered user makes a purchase at a shop with using a negotiable card and receives the services provided by the members server 4. The program segment in FIG. 29 is iterated at a prescribed period. As shown in FIG. 29, a first step 311 decides whether or not customer purchase history information is received from the members server 4. When customer purchase history information is received, the program advances from the step 311 to a step 312. Otherwise, the program exits from the step 311, and then the current execution cycle of the program segment ends. The step 312 settles the account of the purchased article while referring to the received customer purchase history information. A step 313 following the step 312 refers to the customer purchase history information and thereby determines negotiable-card-related use points given to the present user. A step 314 subsequent to the step 313 updates the information in the user history database 15 which relates to the present user. The updating of the information is responsive to the determined negotiable-card-related use points. Specifically, the information in the user history database 15 which represents the negotiable-card-related use points given to the present user is updated. A step 315 following the step 314 sends a signal representative of the updated negotiable-card-related use points to the members server 4. After the step 315, the current execution cycle of the program segment ends.

What is claimed is:
1. An electronic service providing system comprising:
a shop-side terminal device, a user-side terminal device, and an electronic service management server connectable with each other, the shop-side terminal device being located in a shop, the user-side terminal device being possessed by a user, the electronic service management server having a customer card database storing an electronic customer card representative of shop-related use points related to a history of purchases made by the user at the shop;
means for sending the electronic customer card from the electronic service management server to the user-side terminal device;
means provided in the user-side terminal device for indicating the electronic customer card when a purchase is made at the shop;
means for sending information of shop-related use points given by the shop in relation to the purchase from the shop-side terminal device to the electronic service management server;
means provided in the electronic service management server for adding the shop-related use points given by the shop to the electronic customer card to update the electronic customer card;

means provided in the electronic service management server for storing the updated electronic customer card in the customer card database;

a negotiable-card management server to which the electronic service management server is connectable, the negotiable-card management server managing a negotiable card for settling an account concerning a purchase, the negotiable card being possessed by the user; and a card point conversion table provided in the electronic service management server and determining a rate of trade between shop-related use points given by the shop and negotiable-card-related use points given in response to use of the negotiable card; and means for allowing diversion between the shop-related use points and the negotiable-card-related use points by reference to the card point conversion table.

2. An electronic service providing system as recited in claim 1, wherein the electronic service management server has an ownership group conversion table determining rates of trades among shop-related use points given by the shop and other shops, and diversion is allowed among the shop-related use points given by the shop and other shops.

3. An electronic service providing system as recited in claim 1, wherein the shop-related use points or the negotiable-card-related use points can be transferred between the user and another user.

* * * * *